United States Patent
Foes et al.

(10) Patent No.: US 10,670,825 B2
(45) Date of Patent: Jun. 2, 2020

(54) MOUNTING DEVICES WITH INTEGRATED ALIGNMENT ADJUSTMENT FEATURES AND LOCKING MECHANISMS

(71) Applicant: Raytheon Company, Waltham, MA (US)

(72) Inventors: Scott R. Foes, Torrance, CA (US); Ray McVey, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/110,731

(22) Filed: Aug. 23, 2018

(65) Prior Publication Data
US 2020/0064580 A1   Feb. 27, 2020

(51) Int. Cl.
| F16M 13/00 | (2006.01) |
| G02B 7/00 | (2006.01) |
| G02B 7/182 | (2006.01) |
| G02B 7/02 | (2006.01) |
| F16M 11/04 | (2006.01) |

(Continued)

(52) U.S. Cl.
CPC .......... *G02B 7/003* (2013.01); *B29C 65/542* (2013.01); *B29C 65/56* (2013.01); *B29C 66/30321* (2013.01); *B29C 66/30325* (2013.01); *F16M 11/045* (2013.01); *F16M 11/046* (2013.01); *G02B 7/023* (2013.01); *G02B 7/1822* (2013.01);
(Continued)

(58) Field of Classification Search
CPC ...... G02B 7/003; G02B 7/004; B29C 65/542; F16M 13/02; F16F 1/324
See application file for complete search history.

(56) References Cited

U.S. PATENT DOCUMENTS

| 3,063,312 A | 11/1962 | Mueller |
| 3,094,022 A | 6/1963 | Young |

(Continued)

FOREIGN PATENT DOCUMENTS

| EP | 1394554 A1 | 3/2004 |
| JP | H11-084195 A | 3/1999 |

(Continued)

OTHER PUBLICATIONS

Burge, "Adjustments and flexures", University of Arizona, Nov. 2016, 21 pages (see esp. Figure 7.19 and related description).

(Continued)

*Primary Examiner* — Amy J. Sterling

(57) ABSTRACT

An apparatus includes a device mount configured to be coupled to a component. The apparatus also includes an inner hub coupled to the device mount by a first flexure, where the first flexure is configured to permit translational movement of the device mount within the inner hub along a first axis. The apparatus further includes an outer hub coupled to the inner hub by a second flexure, where the second flexure is configured to permit translational movement of the device mount and the inner hub within the outer hub along a second axis different from the first axis. The first and second flexures form a compound nested flexure. The outer hub is configured to be coupled to a support structure and to permit both (i) translational movement of the apparatus along a third axis different from the first and second axes and (ii) tip/tilt adjustment of the apparatus.

20 Claims, 18 Drawing Sheets

(51) Int. Cl.
    *B29C 65/00* (2006.01)
    *B29C 65/56* (2006.01)
    *B29C 65/54* (2006.01)
    *B29L 12/00* (2006.01)

(52) U.S. Cl.
    CPC .... *B29L 2012/00* (2013.01); *F16M 2200/028* (2013.01)

(56) References Cited

U.S. PATENT DOCUMENTS

| | | | |
|---|---|---|---|
| 3,152,818 A | 10/1964 | Ivins | |
| 3,672,231 A | 6/1972 | Shinn et al. | |
| 4,023,891 A * | 5/1977 | Chadwick | G02B 7/1821 359/874 |
| 4,525,852 A | 6/1985 | Rosenberg | |
| 4,559,717 A * | 12/1985 | Scire | B23Q 1/36 33/1 M |
| 4,706,374 A | 11/1987 | Murakami | |
| 4,772,109 A | 9/1988 | Cutburth et al. | |
| 4,882,933 A | 11/1989 | Petersen et al. | |
| 4,912,809 A | 4/1990 | Scheuer | |
| 5,110,195 A | 5/1992 | Loney | |
| 5,123,310 A | 6/1992 | McManus | |
| 5,165,279 A | 11/1992 | Norling et al. | |
| 5,249,197 A | 9/1993 | Kittell | |
| 5,303,080 A | 4/1994 | O'Brien et al. | |
| 5,369,996 A | 12/1994 | Christen et al. | |
| 5,594,170 A | 1/1997 | Peters | |
| 5,644,083 A | 7/1997 | Newell et al. | |
| 5,703,683 A * | 12/1997 | Hunt | G01J 3/44 248/466 |
| 5,757,561 A | 5/1998 | Sechrist et al. | |
| 5,946,969 A | 9/1999 | Munekata et al. | |
| 5,986,827 A | 11/1999 | Hale | |
| 6,263,735 B1 | 7/2001 | Nakatani et al. | |
| 6,813,225 B2 | 11/2004 | Widdowson et al. | |
| 6,922,293 B2 | 7/2005 | Watson et al. | |
| 7,110,634 B2 | 9/2006 | Willis | |
| 7,117,724 B1 | 10/2006 | Goodberlet et al. | |
| 7,219,582 B2 | 5/2007 | Ito | |
| 7,316,381 B2 * | 1/2008 | Hacker | G01M 11/04 248/603 |
| 7,473,082 B2 | 1/2009 | Marielle | |
| 7,599,138 B2 | 10/2009 | Theriault et al. | |
| 8,038,418 B2 * | 10/2011 | Hell | F04B 35/045 417/363 |
| 8,085,482 B2 * | 12/2011 | Frankovich | G02B 7/004 359/824 |
| 9,222,956 B2 | 12/2015 | Bullard | |
| 9,370,865 B1 * | 6/2016 | Vangal-Ramamurthy | B23P 19/102 |
| 9,733,448 B1 | 8/2017 | Bibeault | |
| 2003/0213135 A1 | 11/2003 | Kaneko et al. | |
| 2006/0254375 A1 | 11/2006 | Shoji | |
| 2008/0229566 A1 | 9/2008 | Saito | |
| 2009/0097144 A1 | 4/2009 | Oehlke et al. | |
| 2009/0263085 A1 | 10/2009 | Bornmann et al. | |
| 2010/0212426 A1 | 8/2010 | Oshio | |
| 2012/0304769 A1 | 12/2012 | Watanabe et al. | |
| 2015/0144764 A1 | 5/2015 | Bullard | |
| 2016/0079512 A1 | 3/2016 | Fathi et al. | |
| 2017/0059085 A1 | 3/2017 | Bullard et al. | |
| 2019/0058237 A1 | 2/2019 | Foes et al. | |

FOREIGN PATENT DOCUMENTS

| | | |
|---|---|---|
| JP | 2002-014286 A | 1/2002 |
| WO | 2016025718 A1 | 2/2016 |

OTHER PUBLICATIONS

Thorlabs, Inc., Optomechanics Manufacturing catalog, Apr. 2013, p. 282.
Thorlabs, Inc., "Cage XY Flexure Adjustment Plate", Oct. 2007, 1 page.
Siskiyou Corp., "IXF3.0a", 2017, 6 pages.
Thorlabs,Inc., "CP1XY—30 mm Cage XY Flexure Adjustment Plate", Jul. 2018, 1 page.
Awtar et al., "Design of a Large Range XY Nanopositioning System", Proceedings of the ASME 2010 International Design Engineering Technical Conferences and Information in Engineering Conference, Aug. 2010, 13 pages.
Physik Instruments, "High Precision Nanopositioning Stage: High-Dynamics, Very Stable Piezo Scanner with Extreme Guiding Accuracy P-752", Datasheet, Jan. 2015, 11 pages.
International Search Report and Written Opinion of the International Searching Authority for PCT Patent Application No. PCT/US2014/057495 dated Jan. 13, 2015, 12 pages.
International Search Report and Written Opinion of the International Searching Authority for PCT Patent Application No. PCT/US2016/039439 dated Oct. 10, 2016, 11 pages.
International Search Report and Written Opinion of the International Searching Authority for PCT Patent Application No. PCT/US2018/026664 dated Jul. 17, 2018, 16 pages.
Office Action dated Jan. 22, 2019 in connection with Japanese Patent Application No. 2018-502407, 8 pages.
International Search Report and Written Opinion of the International Searching Authority in connection with International Patent Application No. PCT/US2019/029096 dated Aug. 26, 2019, 15 pages.

* cited by examiner

MOUNTING DEVICES WITH INTEGRATED ALIGNMENT ADJUSTMENT FEATURES AND LOCKING MECHANISMS

TECHNICAL FIELD

This disclosure is generally directed to optical systems. More specifically, this disclosure is directed to mounting devices with integrated alignment adjustment features and locking mechanisms.

BACKGROUND

Many optical systems include mirrors, lenses, or other optical devices that need to be precisely positioned, oriented, or aligned. Often times, a mounting device is used to couple an optical device to a support structure, where the mounting device allows small adjustments to be made to the optical device to help achieve proper positioning, orientation, or alignment. In many cases, a mounting device can support translation of an optical device (movement of the optical device along an adjustment axis), rotation of an optical device (turning of the optical device around an adjustment axis), or both. In some cases, a mounting device supports translation along or rotation around different adjustment axes, meaning the mounting device supports multiple degrees of freedom.

Unfortunately, mounting devices often suffer from a number of shortcomings. For example, some mounting devices provide multiple translational degrees of freedom, but the adjustment axes are not perpendicular to each other. As a result, movement of an optical device along one axis cannot occur without causing movement of the optical device along another axis, which can make it difficult to properly adjust the position of the optical device. Also, some mounting devices provide multiple translational or rotational degrees of freedom without providing locking mechanisms for any or all adjustment axes. In dynamic environments where an optical device may be subjected to load forces (such as shock), the lack of a locking mechanism in each adjustment axis may allow an optical device to move, which can interfere with the operation of a larger optical system.

In one particular approach, a mounting device uses three "push-pulls" (components designed to adjust and hold the space between two structural elements) placed within oversized holes that can operate together to provide translational and rotational adjustments. However, this approach requires the use of special tooling for fine translational adjustments, which tends to be clumsy and ineffective. The tooling also sometimes creates over-constraint and lockdown problems, such as stress-induced distortions of an optical device. Moreover, in order to allow use in a dynamic environment, this approach requires the use of potting (material that hardens after injection into the oversized holes) once the adjustments are finalized, which prevents further adjustments from being made to the optical device's position, orientation, or alignment. In addition, this approach requires multiple knobs to be adjusted in order to make a single translational adjustment to an optical device, which makes it difficult to adjust the position of the optical device along a single adjustment axis.

SUMMARY

This disclosure provides mounting devices with integrated alignment adjustment features and locking mechanisms.

In a first embodiment, an apparatus includes a device mount configured to be coupled to a component. The apparatus also includes an inner hub coupled to the device mount by a first flexure, where the first flexure is configured to permit translational movement of the device mount within the inner hub along a first axis. The apparatus further includes an outer hub coupled to the inner hub by a second flexure, where the second flexure is configured to permit translational movement of the device mount and the inner hub within the outer hub along a second axis different from the first axis. The first and second flexures form a compound nested flexure. The outer hub is configured to be coupled to a support structure and to permit both (i) translational movement of the apparatus along a third axis different from the first and second axes and (ii) tip/tilt adjustment of the apparatus.

In a second embodiment, a system includes multiple optical components configured to receive and process at least one optical beam and at least one mounting device configured to adjust a position, orientation, or alignment of one or more of the optical components. Each mounting device includes a device mount configured to be coupled to at least one of the optical components. Each mounting device also includes an inner hub coupled to the device mount by a first flexure, where the first flexure is configured to permit translational movement of the device mount within the inner hub along a first axis. Each mounting device further includes an outer hub coupled to the inner hub by a second flexure, where the second flexure is configured to permit translational movement of the device mount and the inner hub within the outer hub along a second axis different from the first axis. The first and second flexures form a compound nested flexure. The outer hub is configured to be coupled to a support structure and to permit both (i) translational movement of the mounting device along a third axis different from the first and second axes and (ii) tip/tilt adjustment of the mounting device.

In a third embodiment, a method includes coupling an outer hub of a mounting device to a support structure and coupling a component to a device mount of the mounting device. The method also includes, using a first flexure, causing translational movement of the device mount within an inner hub of the mounting device along a first axis. The method further includes, using a second flexure, causing translational movement of the device mount and the inner hub within the outer hub of the mounting device along a second axis different from the first axis. The first and second flexures form a compound nested flexure. In addition, the method includes causing translational movement of the mounting device along a third axis different from the first and second axes and tip/tilt adjustment of the mounting device.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
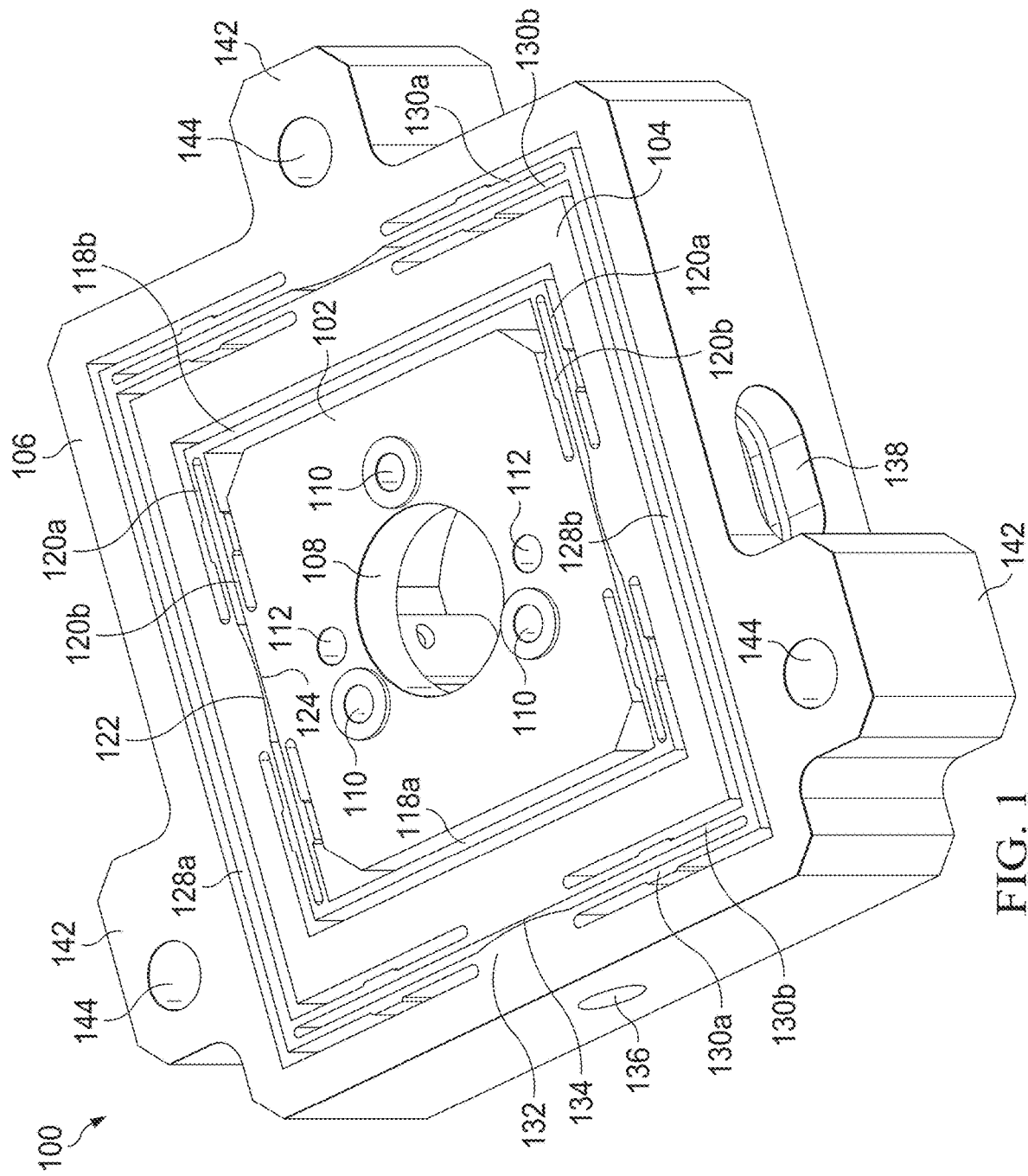
FIGS. 1 through 3 illustrate an example mounting device with integrated alignment adjustment features and locking mechanisms according to this disclosure.

FIGS. 1 through 17, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, mounting devices are often used in optical systems to precisely position, orient, or align mirrors, lenses, or other optical devices. However, mounting devices often suffer from various shortcomings, such as the use of non-perpendicular adjustment axes, the lack of locking mechanisms, or the use of potting. This disclosure describes mounting devices that incorporate integrated alignment adjustment features and locking mechanisms. The mounting devices include a compound nested flexure that supports translational adjustments of an optical device or other device along first and second adjustment axes (which can be perpendicular), and lockable adjusters can be used to make adjustments along the first and second axes. Once positioned, the adjusters can be locked to prevent unintended movements in these adjustment axes (allowing use in harsh vibration environments or other environments), and the lockable adjusters do not require potting (which allows for future adjustments if needed). The compound nested flexure can also be coupled to a support structure or other structure using additional lockable adjusters that allow additional translational adjustment of the optical device or other device along a third adjustment axis (which can be perpendicular to the first and second axes) and that allows tip/tilt adjustments to be made. Once adjusted, these additional adjusters can also be locked to prevent unintended movements in the third adjustment axis and to prevent additional tip/tilt adjustments.

In this way, the mounting devices can provide a large number of degrees of freedom (such as five degrees of freedom) for adjusting the position, orientation, or alignment of an optical device or other device connected to the mounting device. If the optical device or other device can be rotated or otherwise adjusted once coupled to the mounting device, this can provide at least one additional degree of freedom. Note, however, that the additional degree(s) of freedom may not be needed in various systems, such as when a mounting device is used with axially-symmetric optics or in a very forgiving off-axis system.

The mounting devices described below therefore include a novel arrangement for translational adjustments that supports the use of high-fidelity lockable adjusters. This allows for improved alignment in optical systems or other systems since a number of integrated high-fidelity adjustments can be made using the lockable adjusters. The mounting devices can also allow adjustments to be made without requiring the use of complex alignment tools. Further, the mounting devices allow a single lockable adjuster to be used to make adjustments along a single axis, again simplifying the adjustment process. Moreover, since the high-fidelity adjusters are lockable, this reduces or eliminates the need to fill oversized gaps with potting, and it allows the mounting devices to be locked along all adjustment axes. In addition, this approach can help to reduce the time and costs associated with precision alignment of optical components or other components.

Figure 2:
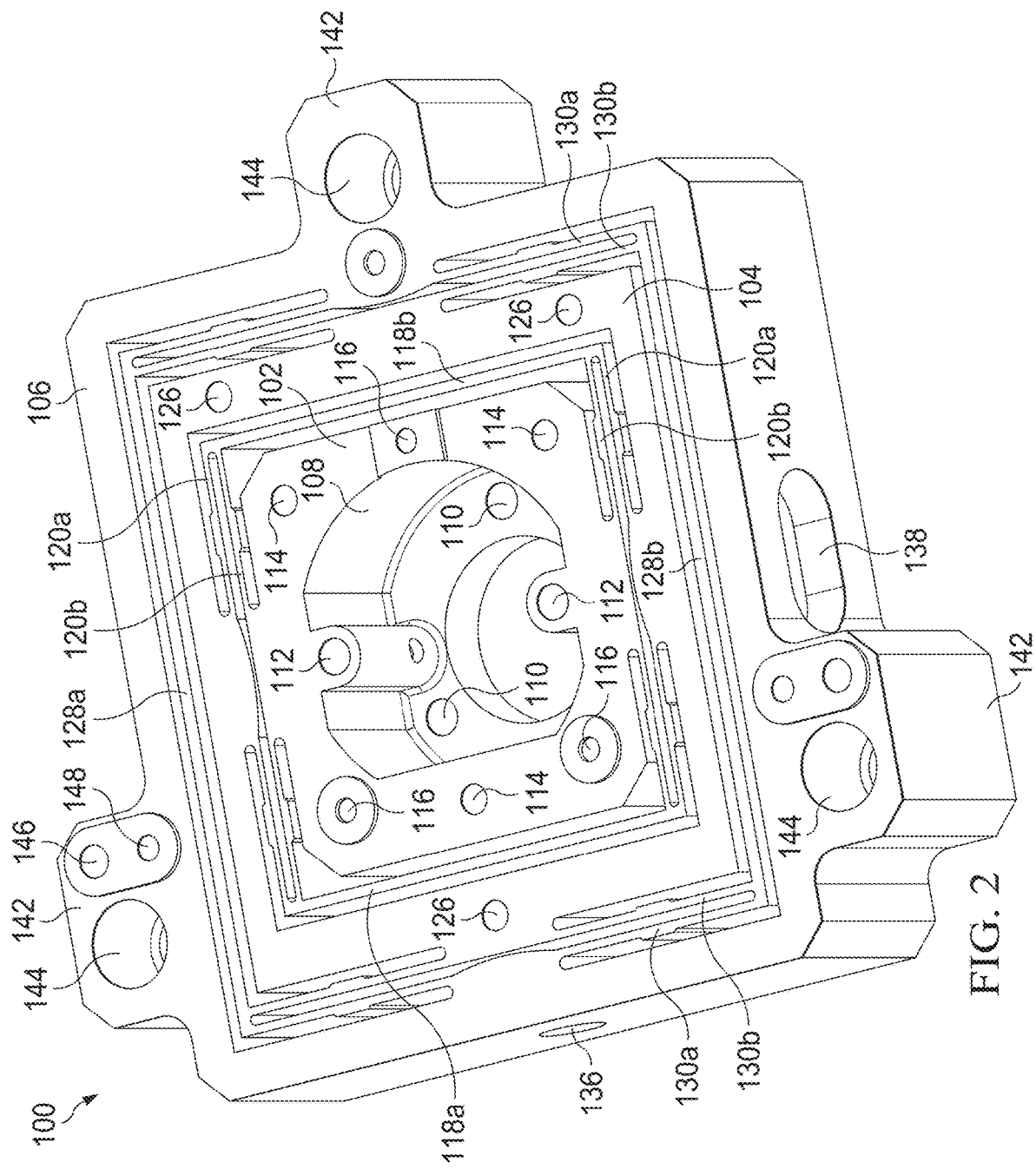
Figure 3:
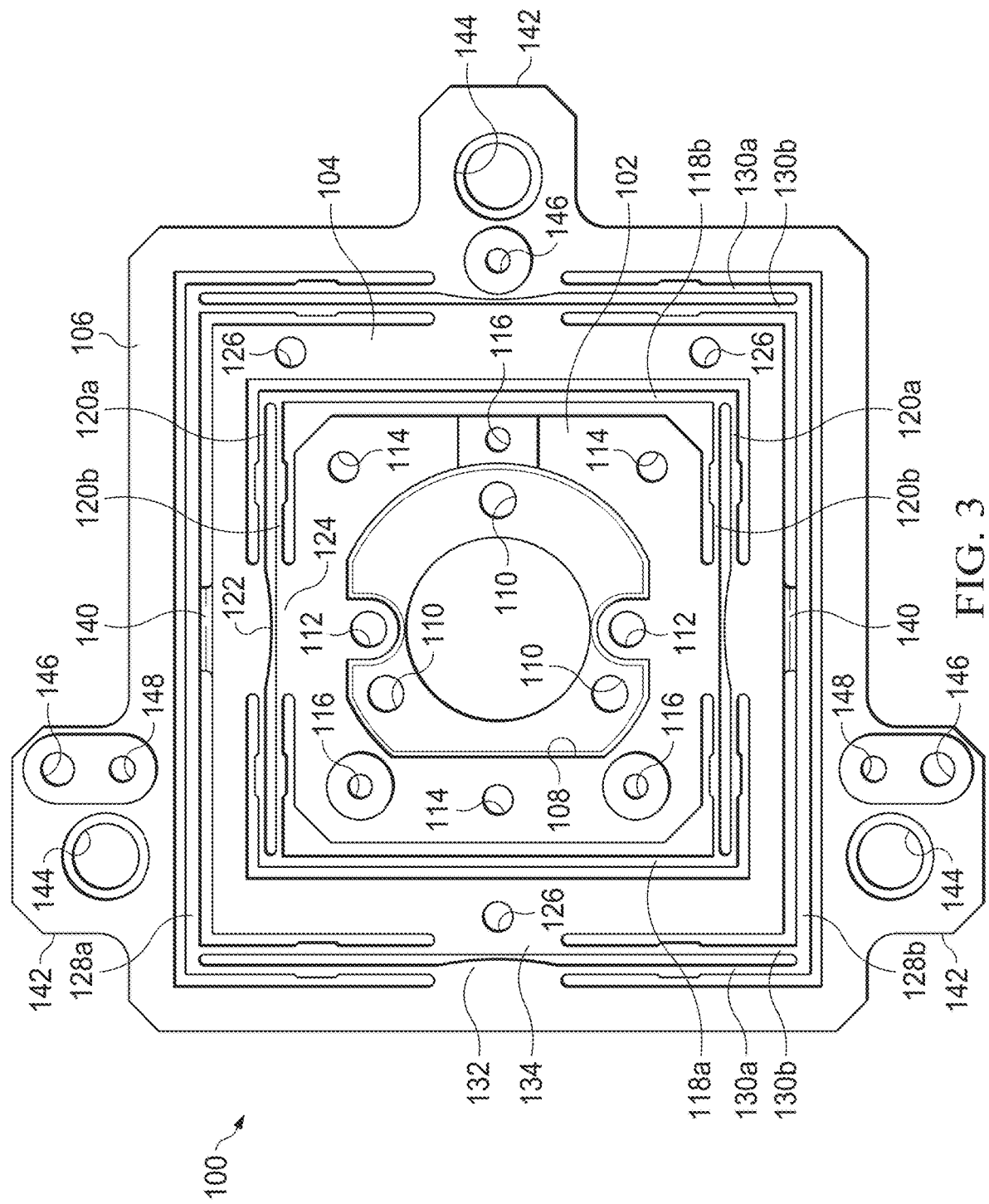
Figure 4:
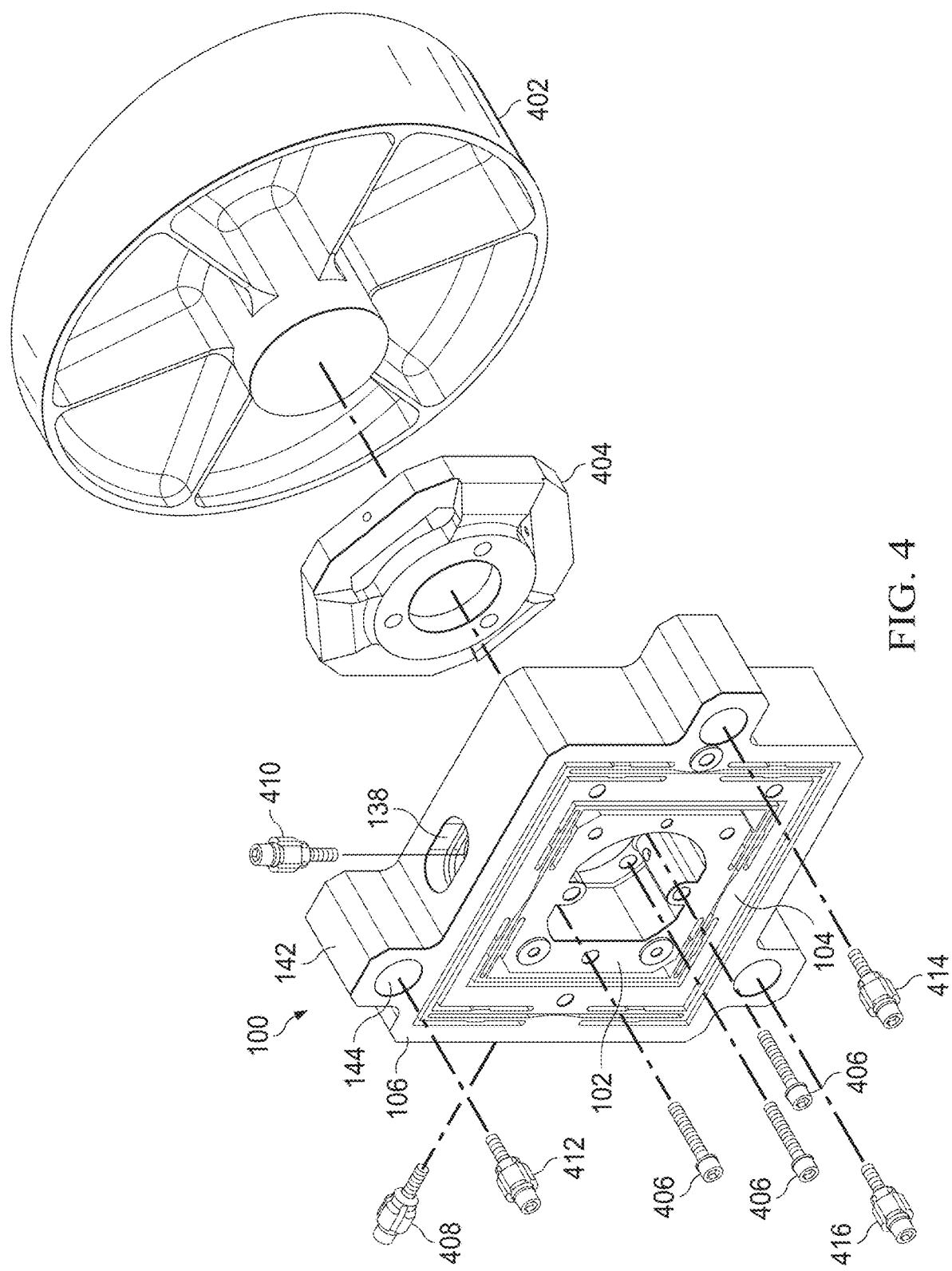
FIGS. 4 through 7 illustrate an example use of a mounting device with integrated alignment adjustment features and locking mechanisms according to this disclosure.
Figure 5:
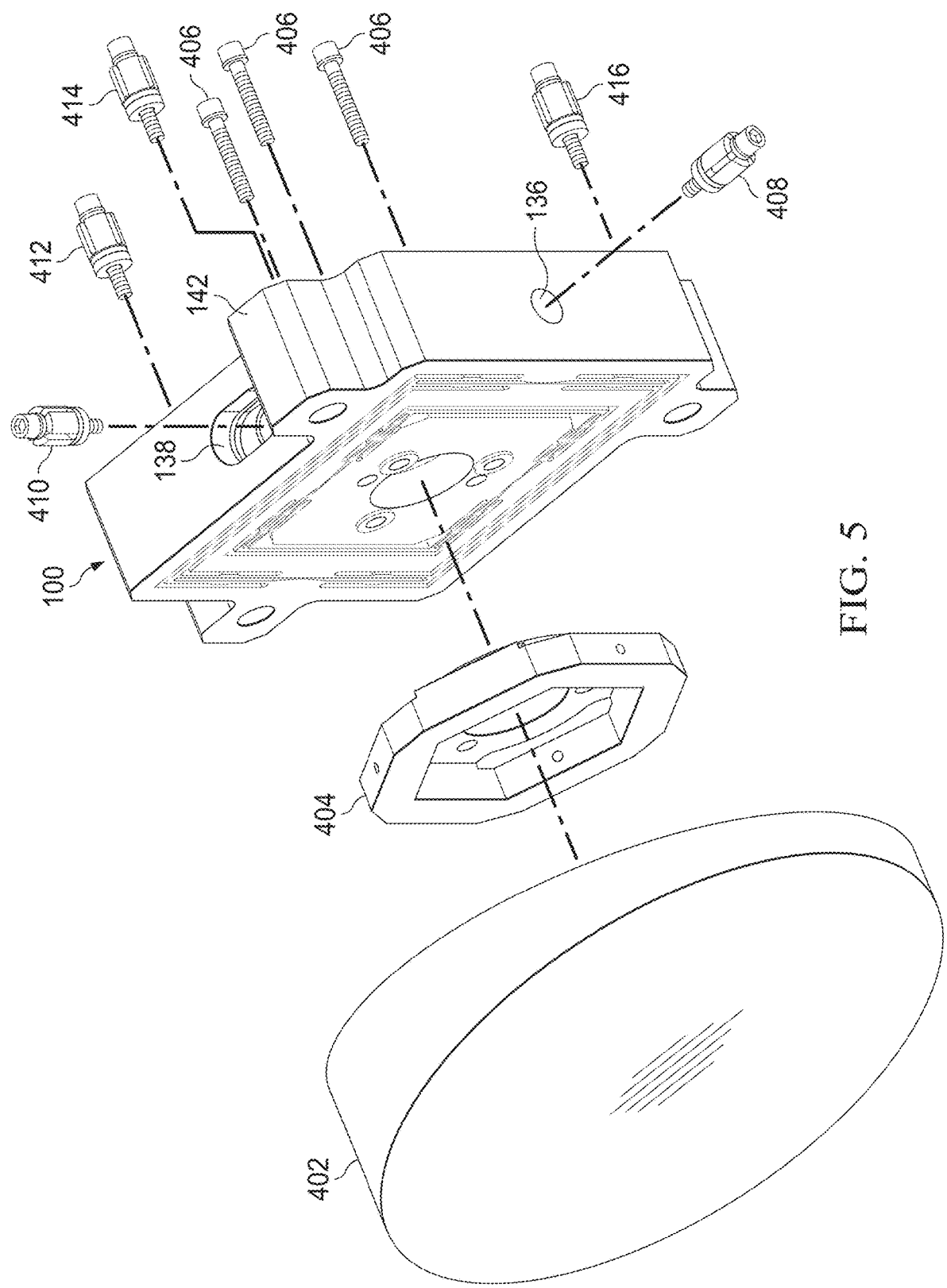
Figure 6:
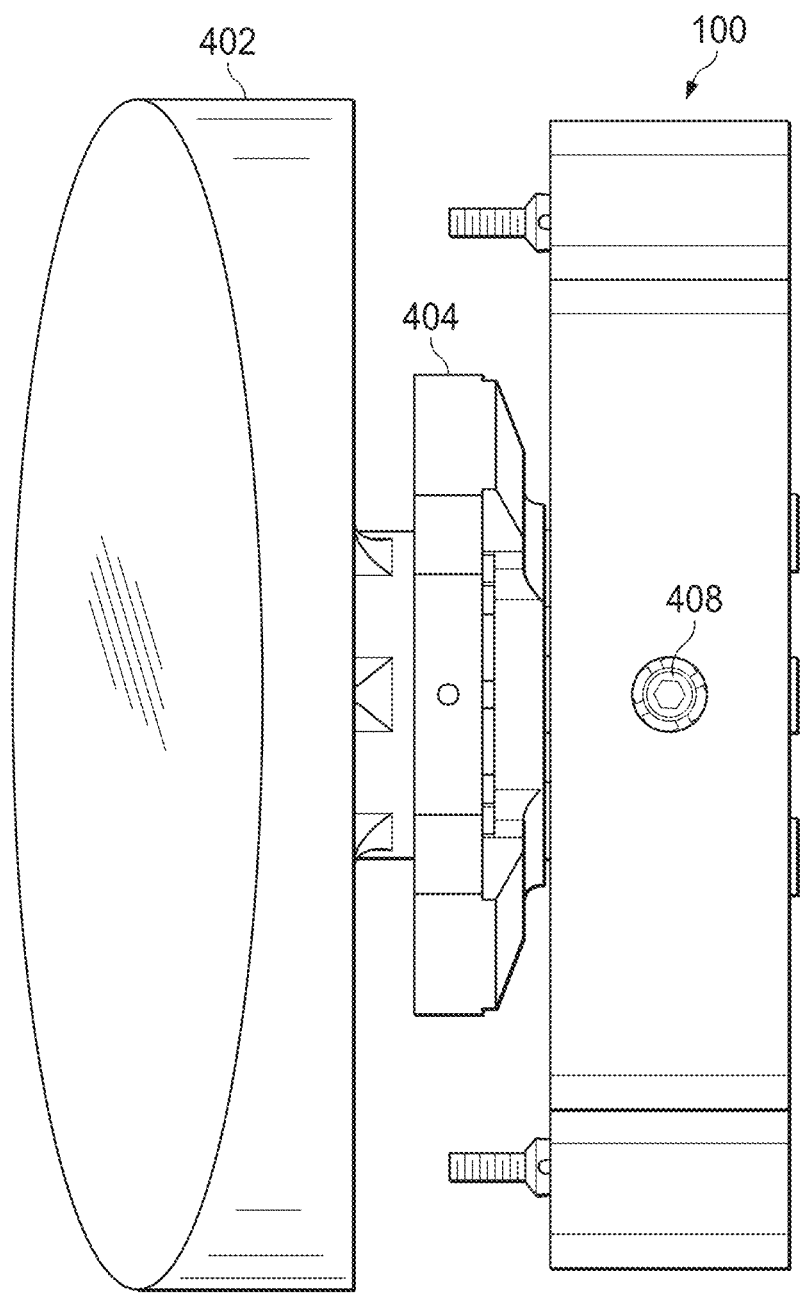
Figure 7:
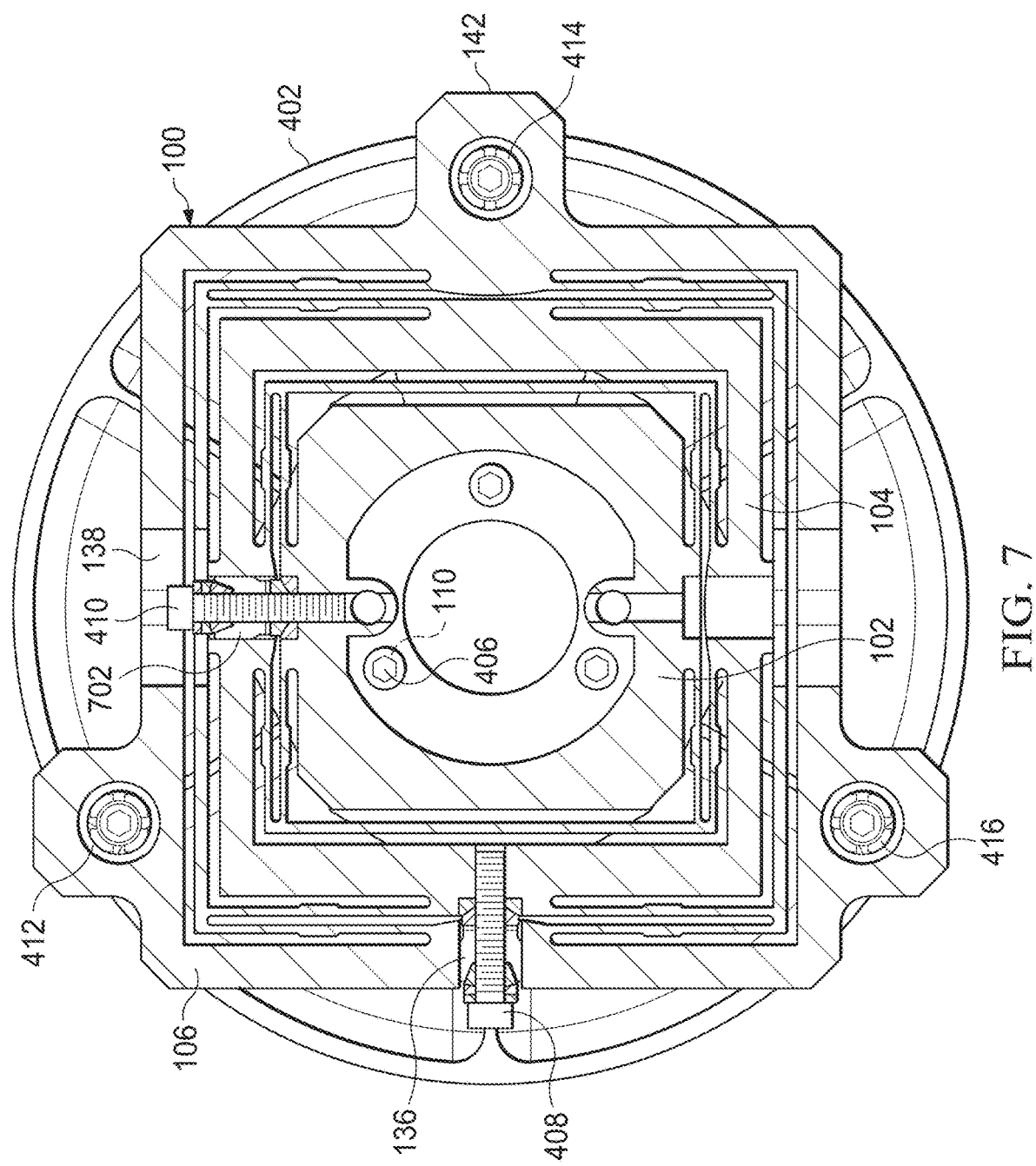

FIGS. 1 through 3 illustrate an example mounting device 100 with integrated alignment adjustment features and locking mechanisms according to this disclosure. In particular, FIG. 1 illustrates a front perspective view of the mounting device 100, FIG. 2 illustrates a rear perspective view of the mounting device 100, and FIG. 3 illustrates a front straight view of the mounting device 100.

As shown in FIGS. 1 through 3, the mounting device 100 generally includes a device mount 102, an inner hub 104, and an outer hub 106. The device mount 102 represents a portion of the mounting device 100 to which at least one optical component or other component can be coupled to the mounting device 100. The device mount 102 can be coupled to any suitable optical component or components, such as one or more mirrors, lenses, prisms, beam splitters, beam expanders, filters, focal planes, focal plane arrays, cameras, or photodetectors. Note that while often described below as being used to mount one or more optical components, the mounting device 100 can be used with any other suitable component(s), including one or more non-optical components.

In this example, the device mount 102 includes a recess 108 forming a smaller opening in the front of the device mount 102 and a larger opening in the back of the device mount 102. An optical component being coupled to the mounting device 100 can be placed against the front of the device mount 102 or can be passed at least partially through the recess 108 of the device mount 102. In some embodiments, the recess 108 provides access to fastening holes 110 from the back of the device mount 102, and the fastening holes 110 allow fasteners like bolts or screws to pass through the recess 108 and through the fastening holes 110 into the component being coupled to the mounting device 100. In this example, there are three fastening holes 110 that are each circular and that are placed in a triangular arrangement, although this is for illustration only. The device mount 102 can include any suitable number of fastening holes 110 having any suitable shape and arrangement. Note that the size and shape of the recess 108 here is for illustration only and that other sizes and shapes can be used. Also note that the recess 108 can be omitted, such as when the fastening holes 110 pass through the complete thickness of the device mount 102 and no component is expected to pass through the device mount 102.

The device mount 102 can also include potting holes 112 passing from the front of the device mount 102 to the back of the device mount 102. In some embodiments, the potting holes 112 can be used to inject potting around lockable adjusters inserted into the mounting device 100 as described in more detail below. However, since the use of potting is optional here, the potting holes 112 can be omitted if desired. Similarly, a first set of post holes 114 passing into the back of the device mount 102 can be used to receive posts from a reinforcing backing plate as described in more detail below. However, the use of a backing plate is optional here, and the post holes 114 can be omitted if desired. Further, tooling holes 116 in the back of the device mount 102 can be used to hold spherically mounted retroreflector (SMR) nests or other targets, which can be used in conjunction with a laser tracker to track translations and angles. However, this functionality may not be needed, so the tooling holes 116 can be omitted if desired.

The inner hub 104 is connected to the device mount 102 using a first pair of support bars 118a-118b that attach to the inner hub 104 via first connecting arms 120a and that attach to the device mount 102 via second connecting arms 120b. The support bars 118a-118b are located on opposite sides of the device mount 102. The support bars 118a-118b and the connecting arms 120a-120b form a first flexure that allows the device mount 102 to move by a small amount along a single axis within the inner hub 104 (up and down in FIG. 3). For example, the device mount 102 can be moved upward in FIG. 3 until a projection 122 of the inner hub 104 (which couples the inner hub 104 to the first connecting arms 120a) contacts a projection 124 of the device mount 102 (which couples the device mount 102 to the second connecting arms 120b). A similar action can occur when the device mount 102 is moved downward in FIG. 3. The projections 122 of the inner hub 104 can therefore function as hard stops to limit movement of the device mount 102 within the inner hub 104.

The inner hub 104 can also include a second set of post holes 126 passing into the back of the inner hub 104. The post holes 126 can be used to receive posts from a reinforcing backing plate as described in more detail below. However, since the use of the backing plate is optional here, the post holes 126 can be omitted if desired.

The outer hub 106 is connected to the inner hub 104 in a similar manner using a second pair of support bars 128a-128b that attach to the outer hub 106 via third connecting arms 130a and that attach to the inner hub 104 via fourth connecting arms 130b. The support bars 128a-128b are located on opposite sides of the inner hub 104, and the support bars 128a-128b can extend in a direction generally transverse to the direction in which the first pair of support bars 118a-118b extends. The second pair of support bars 128a-128b and the connecting arms 130a-130b form a second flexure that allows the inner hub 104 to move by a small amount along a single axis within the outer hub 106 (left and right in FIG. 3). For example, the inner hub 104 can be moved to the left in FIG. 3 until a projection 132 of the outer hub 106 (which couples the outer hub 106 to the third connecting arms 130a) contacts a projection 134 of the inner hub 104 (which couples the inner hub 104 to the fourth connecting arms 130b). A similar action can occur when the inner hub 104 is moved to the right in FIG. 3. The projections 132 of the outer hub 106 can therefore function as hard stops to limit movement of the inner hub 104 within the outer hub 106.

The support bars 118a-118b, 128a-128b and connecting arms 120a-120b, 130a-130b shown here are linear structures. This helps to constrain movement of the device mount 102 to two axes defined by these linear structures. In the illustrated example, the connecting arms 120a-120b and 130a-130b do not have a common thickness along their lengths. Rather, each connecting arm 120a-120b is generally thicker at or near its midpoint and thinner elsewhere. However, this is not required, and each connecting arm 120a-120b can have a substantially constant thickness along its length.

As can be seen here, the mounting device 100 incorporates a compound nested flexure formed by the first and second flexures described above ("compound" since there are multiple flexures and "nested" since the first flexure is positioned within the second flexure). In the absence of excessive forces on the mounting device 100, the compound nested flexure constrains translational movement of the device mount 102 to one axis and constrains translational movement of the inner hub 104 to another perpendicular axis. As a result, the device mount 102 can be movable within the mounting device 100 along two perpendicular translational adjustment axes.

One side of the outer hub 106 includes a first opening 136. As described in more detail below, the first opening 136 is configured to receive a lockable adjuster that can be inserted through the first opening 136 and used to alter and set the position of the inner hub 104 within the outer hub 106. Two other sides of the outer hub 106 include second openings 138, which align with openings in the inner hub 104 (not shown here). As described in more detail below, each second opening 138 is configured to receive a lockable adjuster, which can be inserted through that second opening 138 and through the opening in the inner hub 104 and used to alter and set the position of the device mount 102 within the inner hub 104. Note that while two second openings 138 are described here, it is possible to alter and set the position of the device mount 102 within the inner hub 104 using a single lockable adjuster inserted through a single second opening 138. Connecting bridges 140 can be used to physically couple the inner hub 104 to the second set of support bars 128a-128b, and the openings in the inner hub 104 can extend into the connecting bridges 140. However, the connecting bridges 140 here are optional and can be omitted.

The outer hub 106 in this example also includes a number of flanges 142, each of which includes a third opening 144. As described in more detail below, the third openings 144 are configured to receive lockable adjusters that can be inserted through the third openings 144 and used to couple the outer hub 106 to a support structure. Also, individual lockable adjusters or combinations of lockable adjusters can be used to alter the tip or tilt of the mounting device 100, which also adjusts the tip or tilt of the component coupled to the device mount 102. In addition, the lockable adjusters can all be adjusted in order to move the entire mounting device 100 towards or away from the support structure to which the mounting device 100 is coupled (which provides a third translational degree of freedom). In this example, there are three flanges 142 with three circular third openings 144, although this is for illustration only. The outer hub 106 can include any suitable number of flanges 142 in any suitable arrangement with third openings 144 having any suitable shape. However, the flanges 142 can be omitted here, such as when the third openings 144 are included in other portions of the outer hub 106.

The outer hub 106 in this example further includes reinforcement holes 146 and pin holes 148. The reinforcement holes 146 can represent internally-threaded holes or other structures that receive bolts, screws, or other fasteners used to connect a reinforcing backing plate to the mounting device 100 as described in more detail below. The pin holes 148 can receive pins or other structures that are insertable into holes of the backing plate in order to hold the backing plate in a suitable position during installation. Once the backing plate is maneuvered into a desired position, the fasteners can be inserted through the reinforcement holes 146 to secure the backing plate in place. In this example, there are three circular reinforcement holes 146 and two circular pin holes 148, although this is for illustration only. The outer hub 106 can include any suitable number of reinforcement holes 146 and pin holes 148 having any suitable shapes and arrangements. However, since the backing plate is optional here, the reinforcement holes 146 and pin holes 148 can be omitted.

In this example, the device mount 102, the inner hub 104, and the outer hub 106 are generally coaxial or concentric, meaning they share a common central axis. The common central axis here extends through the center of the recess 108 shown in FIG. 3. However, this need not be the case. For example, other embodiments can be used where the central axis of the inner hub 104 is offset from the central axis of the outer hub 106 or where the central axis of the device mount 102 is offset from the central axis/axes of the inner hub 104, the outer hub 106, or both.

The mounting device 100 shown in FIGS. 1 through 3 can be formed from any suitable material(s). For example, in some embodiments, the mounting device 100 can be formed from aluminum, steel, titanium, or other metals or metal alloys. In other embodiments, the mounting device 100 can be formed from material having a low coefficient of thermal expansion, such as Invar (also known generically as FeNi36 or 64FeNi).

The mounting device 100 can also be formed in any suitable manner. In some embodiments, the mounting device 100 can be formed by machining, injection molding, three-dimensional (3D) printing, or other manufacturing technique that forms the mounting device 100 as a single integral structure. In other embodiments, individual components of the mounting device 100 can be formed separately and attached to form the mounting device 100, such as via welding or brazing. In particular embodiments, the mounting device 100 can be fabricated from a single piece of material by using drilling, etching, or other machine operations to remove portions of the single piece of material and form the completed mounting device 100.

The mounting device 100 here can have any suitable size, shape, and dimensions. Also, the mounting device 100 can be easily scalable to larger or smaller sizes as needed. For instance, the size of the mounting device 100 can be based on the component(s) to be coupled to the mounting device 100, and the shape of the mounting device 100 can be based on the support structure to which the mounting device 100 will be coupled. Of course, any other or additional design considerations can be taken into account when designing and fabricating the mounting device 100.

In the example shown in FIGS. 1 through 3, the mounting device 100 supports five degrees of freedom, meaning adjustments can be made in five different ways to properly position, orient, or align an optical component or other component. Two degrees of freedom are translational degrees of freedom supported by the compound nested flexure. The compound flexure allows adjustment of the position of the device mount 102 within the inner hub 104 in a first direction (using a lockable adjuster inserted through the first opening 136). The compound flexure also allows adjustment of the position of the inner hub 104 within the outer hub 106 in a second direction (using a lockable adjuster inserted through one of the second openings 138 and through a corresponding opening in the inner hub 104). A third degree of freedom is a translational degree of freedom obtainable by adjusting the position of the mounting device 100 in a third direction towards or away from a support structure using all lockable adjusters inserted through all of the third openings 144. The last two degrees of freedom are supported by adjusting some (but not all) of the lockable adjusters inserted through the third openings 144 to make tip/tilt adjustments. As noted above, if the optical component or other component coupled to the device mount 102 can be adjusted (such as by being rotated), one or more additional degrees of freedom can be obtained. It should be noted that not all degrees of freedom might need adjustment in particular circumstances.

In addition to providing a large number of degrees of freedom for adjustment, the mounting device 100 provides various additional features that can be useful or beneficial. For example, the first, second, and third directions mentioned above can be orthogonal, so changes made in one direction ideally do not affect the position of an optical component or other component in the other directions (at least to any optically noticeable or other significant extent). Also, since all of the adjusters used with the mounting device 100 are lockable, the mounting device 100 can be configured as needed and then locked into a suitable configuration. Even when used in harsh vibration environments or harsh other environments, the mounting device 100 can hold an optical component or other component in a desired position more securely. Further, in some embodiments, all of the lockable adjusters can be adjusted using the same tool, and potting is not required with the lockable adjusters (so adjustments can be made at any time). In addition, various features can be used with the mounting device 100, such as a backing plate that helps to reduce or prevent stress-induced distortions caused by lockdown of the mounting device 100.

It should be noted that while the mounting device 100 has been described above as being used to securely mount an optical component and hold the optical component in place, other uses of the mounting device 100 are also possible. For example, controllable actuators can be used with the mounting device 100 in place of the lockable adjusters. The controllable actuators can be controlled using suitable electrical or other control signals to alter the position, tip, tilt, or other aspect(s) of an optical component or other component coupled to the device mount 102. This can be useful in various devices and systems, such as to provide optical image stabilization in cameras or video cameras or other automatic adjustments. This type of approach can also be used in super-resolution imaging systems or other high-resolution imaging systems.

Although FIGS. 1 through 3 illustrate one example of a mounting device 100 with integrated alignment adjustment features and locking mechanisms, various changes may be made to FIGS. 1 through 3. For example, the mounting device 100 itself and each of its individual components can have any suitable size, shape, and dimensions. Also, while often described as being used with an optical device or component, the mounting device 100 can be used with any suitable device or component in which accurate and precise mounting is needed or desired.

FIGS. 4 through 7 illustrate an example use of a mounting device 100 with integrated alignment adjustment features and locking mechanisms. In particular, FIGS. 4 through 7 illustrate an example use of the mounting device 100 being coupled to an optical component, namely an optical mirror 402. As noted above, however, the mounting device 100 can be used with various types of optical components or other components.

As shown in FIGS. 4 through 7, the mirror 402 generally has a flat reflective surface that is angled (oblique) with respect to a central optical axis of the mirror 402. In use, this type of mirror 402 can be used to receive an optical beam and redirect the optical beam in a desired direction. However, it should be noted that various other types of mirrors can be used here, including convex, concave, or aspherical mirrors. A base of the mirror 402 can be inserted into or otherwise attached to a mirror hub 404. The mirror hub 404 represents a structure that can be bolted or otherwise fastened to the mounting device 100 in order to secure the mirror 402 on the mounting device 100. However, the mirror 402 can be coupled to the mounting device 100 directly or indirectly in any other suitable manner.

One or more fasteners 406 can be used to couple the device mount 102 to the mirror 402. In this example, three fasteners 406 are used and can be inserted through the fastening holes 110 of the device mount 102. These fasteners 406 can extend through the fastening holes 110 and into receptacles of the mirror hub 404 in this example, securing the mirror hub 404 to the device mount 102. Each fastener 406 includes any suitable structure for fixedly connecting a device to a device mount, such as bolts or screws.

A lockable fastener 408 is insertable through the first opening 136 of the outer hub 106 and is used to control the position of the inner hub 104 within the outer hub 106. As noted above, the inner hub 104 is movable within the outer hub 106 (left and right in FIG. 7). The lockable fastener 408 can therefore move the inner hub 104 left or right in FIG. 7 within the outer hub 106 to provide translational movement of the device mount 102 in one direction. Similarly, another lockable fastener 410 is insertable through one of the second openings 138 of the outer hub 106 and through a corresponding fourth opening 702 of the inner hub 104 in order to control the position of the device mount 102 within the inner hub 104. As noted above, the device mount 102 is movable within the inner hub 104 (up and down in FIG. 7). The lockable fastener 410 can therefore move the device mount 102 up or down in FIG. 7 within the inner hub 104 to provide translational movement of the device mount 102 in another direction.

Three additional lockable fasteners 412, 414, and 416 are insertable through the third openings 144 of the flanges 142 in order to couple the mounting device 100 to a support structure. All three lockable fasteners 412, 414, and 416 can be adjusted in the same way to move the mounting device 100 closer to the support structure or farther away from the support structure to provide translational movement of the device mount 102 in a third direction. Individual lockable fasteners 412, 414, or 416 or combinations of some (but not all) lockable fasteners 412, 414, and 416 can be adjusted to provide tip/tilt movement of the device mount 102.

Each of the lockable fasteners 408-416 includes any suitable structure configured to alter and set the distance between two components. For example, in some embodiments, each lockable fastener 408-416 can include a "push-pull," an example of which is described below. In other embodiments, each lockable fastener 408-416 can include a differential screw with a jam nut.

In one aspect of use, a technician or other personnel can attach the mirror 402 or its hub 404 to the device mount 102 using the fasteners 406, which can secure the mirror 402 or its hub 404 on the device mount 102. The technician or other personnel can also attach the outer hub 106 to a support structure using the lockable fasteners 412, 414, or 416, which can secure the mounting device 100 on the support structure. The technician or other personnel can also make adjustments to the lockable fasteners 408 and 410 to move the mirror 402 along two translational adjustment axes. The technician or other personnel can make further adjustments to one or more of the lockable fasteners 412, 414, or 416 to move the mirror 402 along an additional translational adjustment axis or to make tip/tilt adjustments to the mirror 402. This approach therefore supports a low part count and an easy assembly and adjustment process.

Although FIGS. 4 through 7 illustrate one example use of a mounting device 100 with integrated alignment adjustment features and locking mechanisms, various changes may be made to FIGS. 4 through 7. For example, the mounting device 100 can be used to mount any other suitable optical component or other component to a support structure. Also, the lockable fasteners 408-416 could be replaced by controllable actuators, and at least one controller can be used to control the actuators in order to provide automatic adjustments to the optical component(s) or other component(s).

Figure 8A:
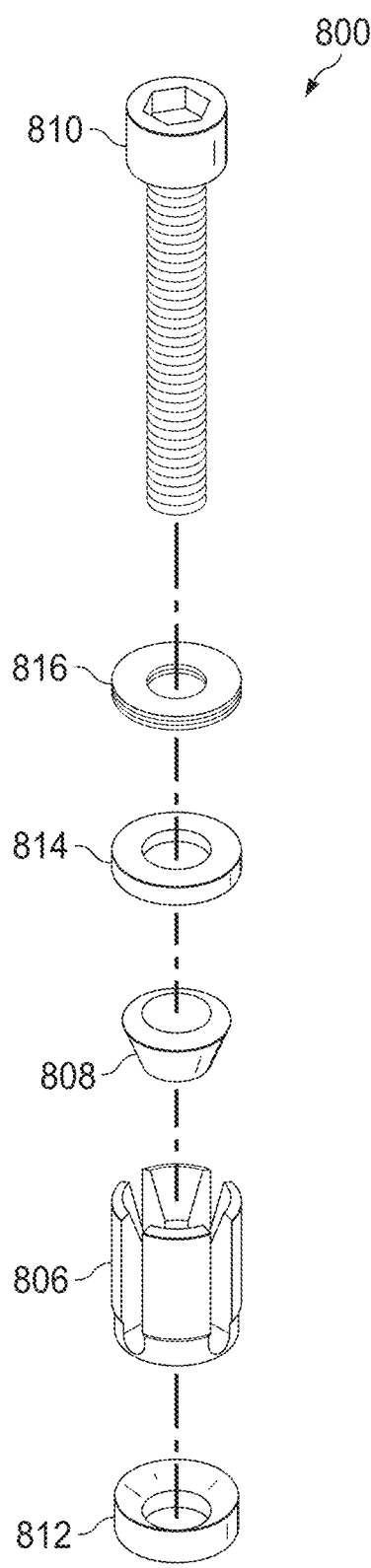
FIGS. 8A and 8B illustrate an example locking mechanism in a mounting device according to this disclosure.
Figure 8B:
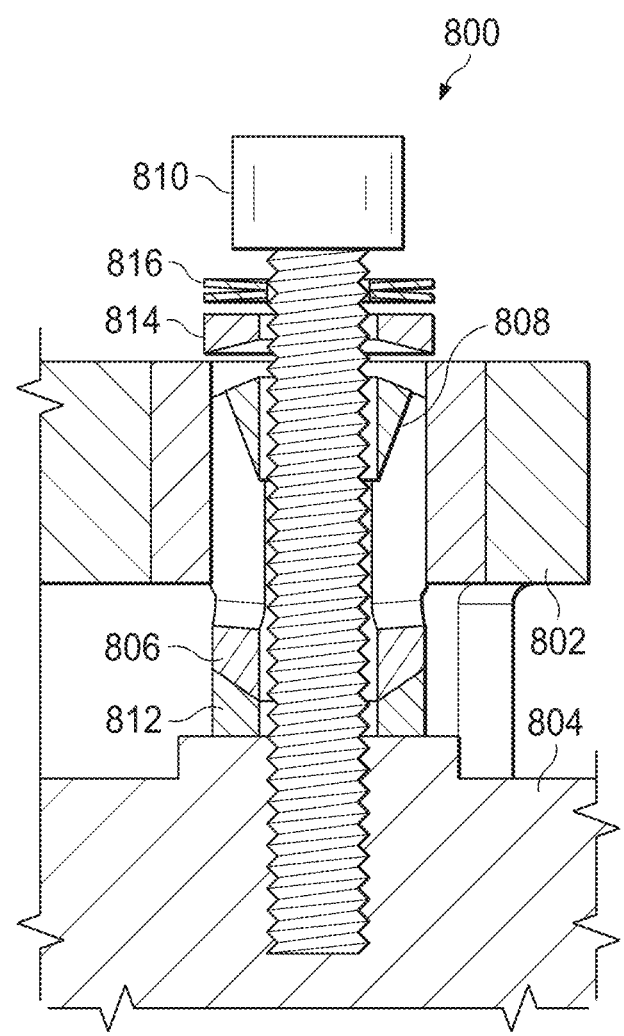

FIGS. 8A and 8B illustrate an example locking mechanism 800 in a mounting device according to this disclosure. The locking mechanism 800 shown in FIGS. 8A and 8B can, for example, represent any of the lockable fasteners 408-416 discussed above. However, as noted above, other embodiments of the lockable fasteners 408-416 can also be used.

In the example shown in FIGS. 8A and 8B, the locking mechanism 800 represents a "push-pull" device that is used to adjust and set a distance between two objects 802 and 804. The object 802 may be referred to as a stationary object and the object 804 may be referred to as a movable object, although this is merely for convenience and does not impart any structural requirements on either of the objects 802 and 804. In the mounting device 100, the object 802 can represent the outer hub 106 when the object 804 represents the inner hub 104, or the object 802 can represent the inner hub 104 when the object 804 represents the device mount 102.

As shown here, the locking mechanism 800 includes an adjusting screw 806, a conical washer 808, and a locking screw 810. The adjusting screw 806 has external threads, and the object 802 has corresponding internal threads. Thus, the adjusting screw 806 can be inserted into the internally-threaded portion of the object 802 so that the bottom of the adjusting screw 806 extends into the space between the objects 802 and 804. The adjusting screw 806 can also be adjusted to achieve a desired distance between the objects 802 and 804.

The locking screw 810 has external threads, while the object 804 has corresponding internal threads. To lock the position of the objects 802 and 804 with respect to each other, the threaded portion of the locking screw 810 is inserted into the internally-threaded portion of the object 804. When the locking screw 810 is tightened, the conical washer 808 jams the tines of the adjusting screw 806, which prevents the adjusting screw 806 from moving out of the object 802.

Additional washers 812, 814, and 816 are used here to support various functions. For example, the washer 812 can include an angled top used to receive the bottom of the adjusting screw 806 and to maintain separation of the adjusting screw 806 from the object 804. The washer 814 can be used to maintain separation of the top of the locking screw 810 from the adjusting screw 806. The washer 816 can represent a Belleville washer that helps to prevent undesired rotation of the locking screw 810 once tightened.

Although FIGS. 8A and 8B illustrate one example of a locking mechanism 800 in a mounting device, various changes may be made to FIGS. 8A and 8B. For example, the locking mechanism 800 itself and each of its individual components can have any suitable size, shape, and dimensions. Also, any other suitable locking mechanism can be used to separate multiple components of a mounting device and to lock the components of the mounting device in that position.

Figure 9:
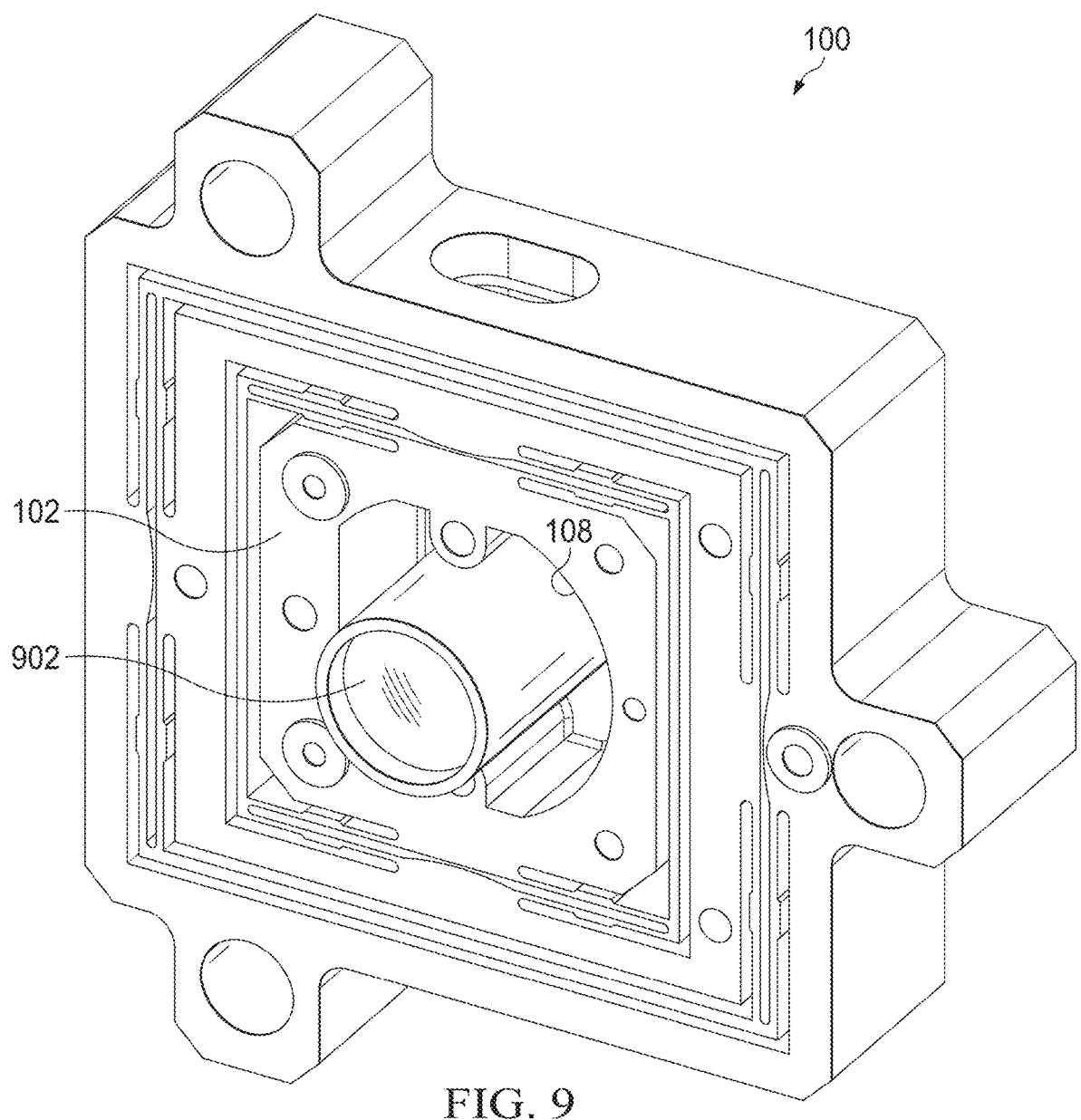
FIGS. 9 through 11 illustrate another example use of a mounting device with integrated alignment adjustment features and locking mechanisms according to this disclosure.
Figure 10:
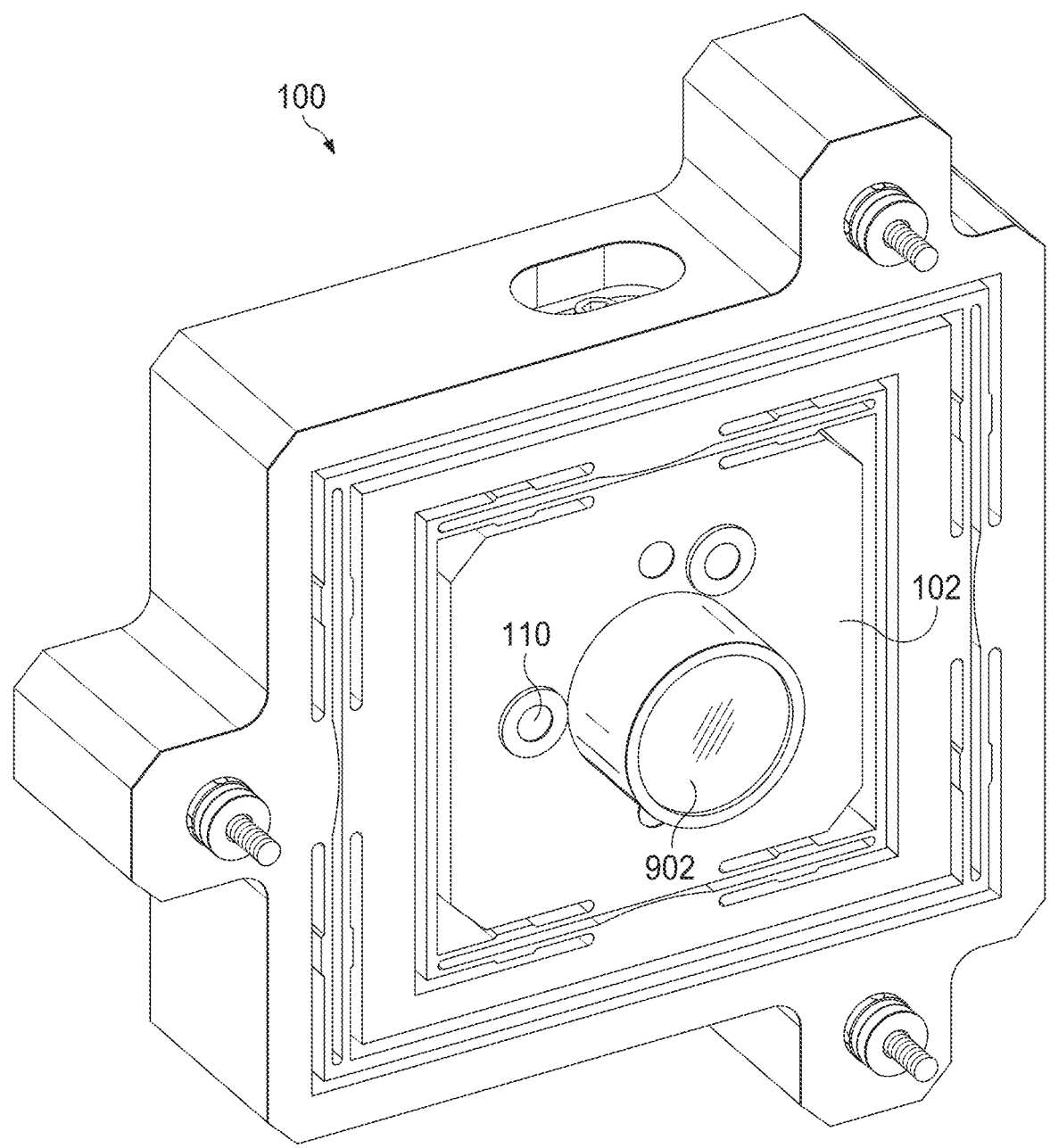
Figure 11:
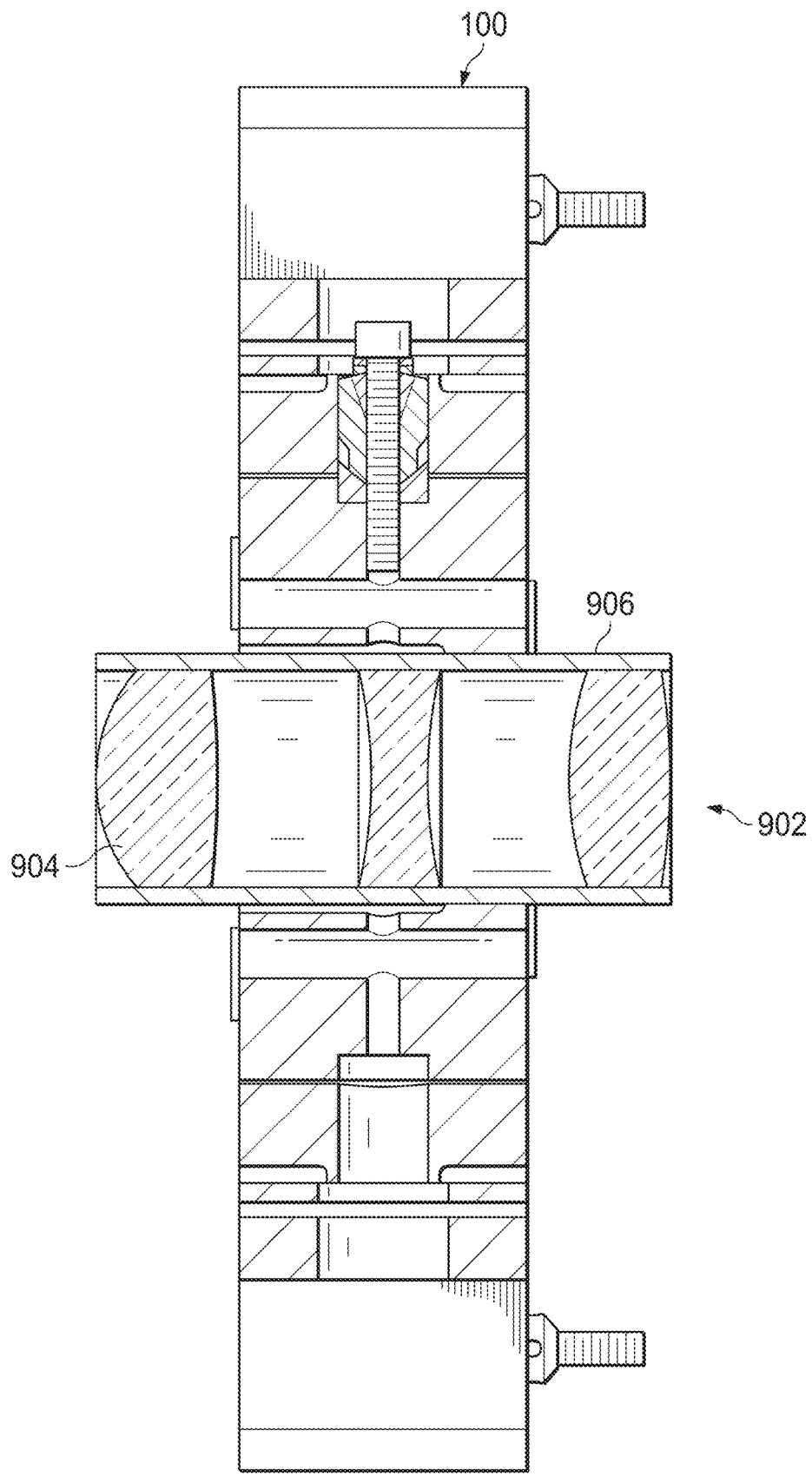
Figure 12:
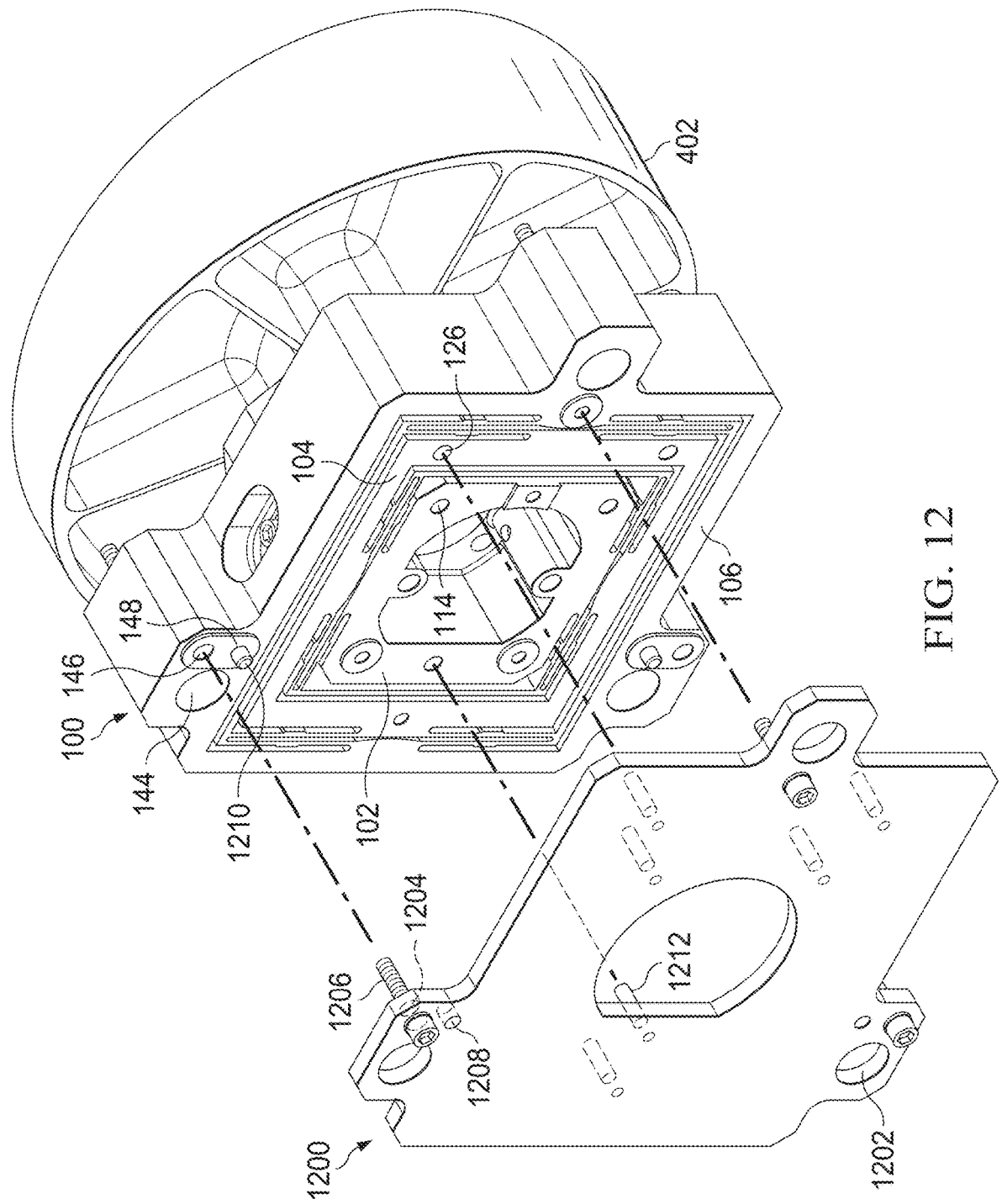
FIGS. 12 through 15 illustrate an example backing plate for a mounting device with integrated alignment adjustment features and locking mechanisms according to this disclosure.
Figure 13:
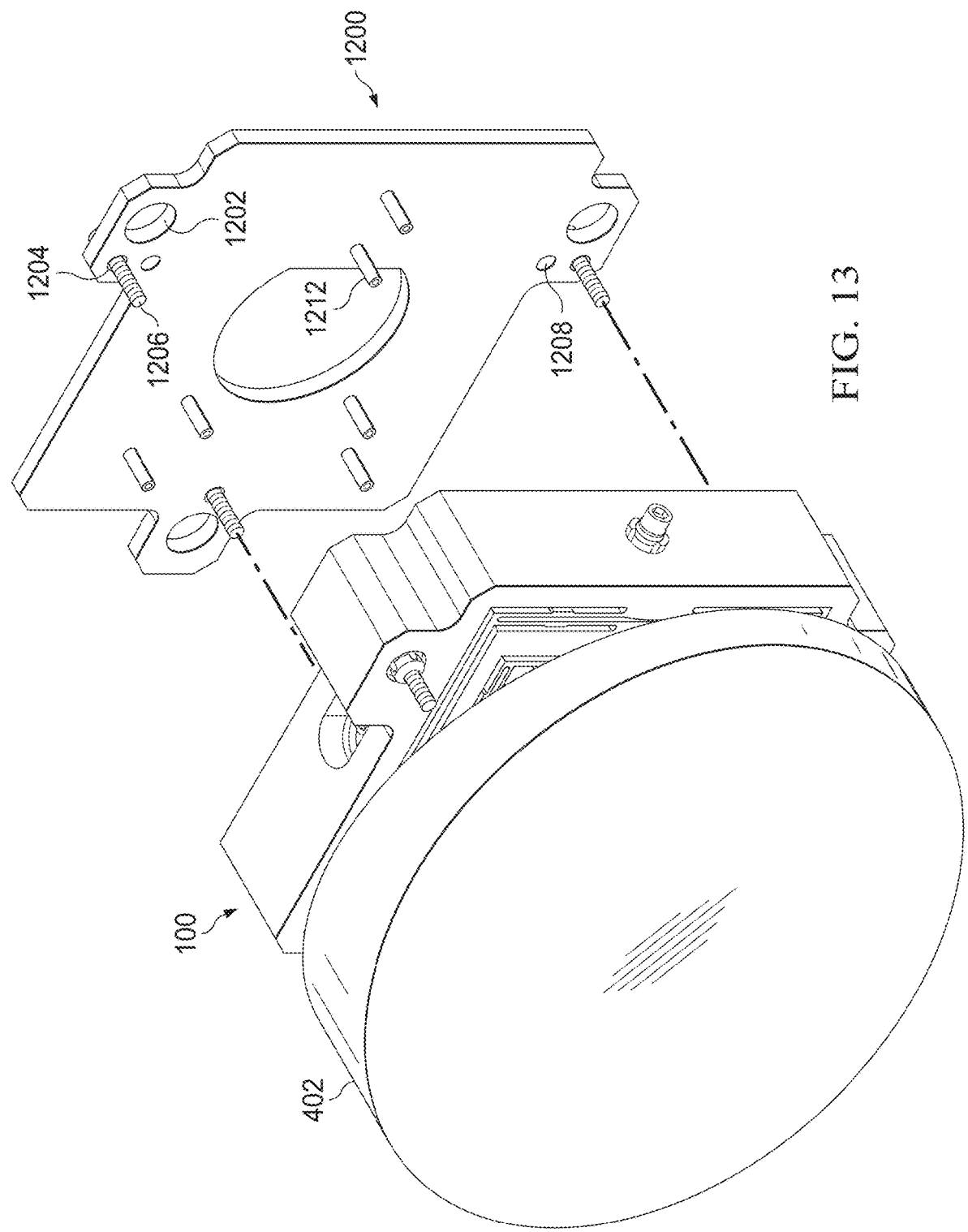
Figure 14:
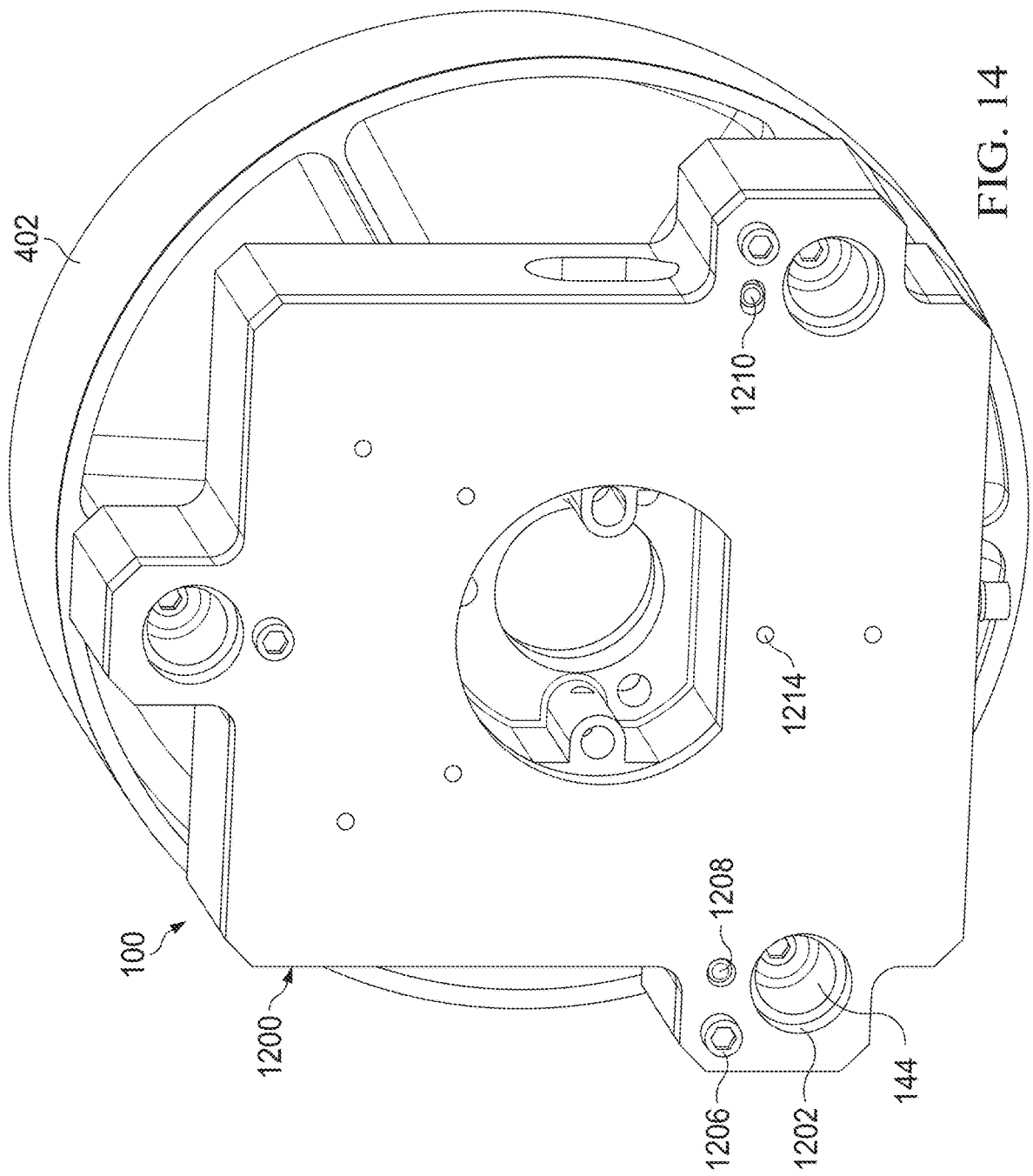
Figure 15:
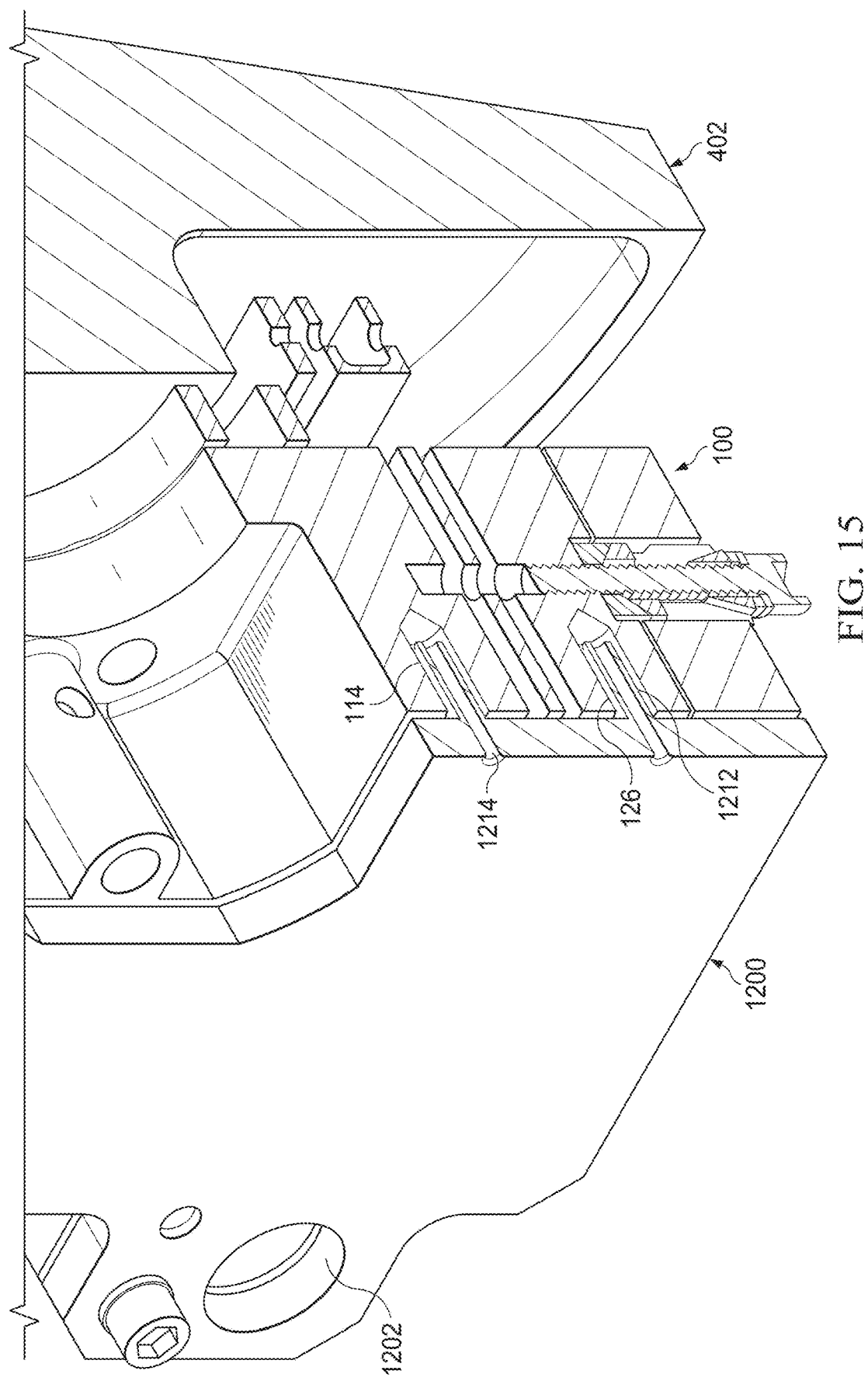

FIGS. 9 through 11 illustrate another example use of a mounting device 100 with integrated alignment adjustment features and locking mechanisms according to this disclosure. In this example, a lens or lens group 902 is inserted through the recess 108 of the device mount 102 and extends beyond the front and back of the device mount 102. However, the lens or lens group 902 can have any other suitable size and shape, including a size and shape that fits within the recess 108 of the device mount 102 or that extends beyond the front or back (but not both) of the device mount 102.

In this particular example, the lens or lens group 902 includes three lenses 904 arranged within a housing 906. Two lenses 904 are positioned at ends of the housing 906, while a third lens 904 is positioned at or near the middle of the housing 906. However, this arrangement is for illustration only, and the lens or lens group 902 can include any suitable number of lenses (including a single lens) having any suitable arrangement with respect to the device mount 102. The housing 906 here can include flanges that allow coupling via fasteners inserted through the fastening holes 110 of the device mount 102, although the housing 906 can be secured to the device mount 102 in any other suitable manner.

Although FIGS. 9 through 11 illustrate another example use of a mounting device 100 with integrated alignment adjustment features and locking mechanisms, various changes may be made to FIGS. 9 through 11. For example, the mounting device 100 can be used to mount any other suitable optical component or other component to a support structure.

FIGS. 12 through 15 illustrate an example backing plate 1200 used with a mounting device 100 having integrated alignment adjustment features and locking mechanisms according to this disclosure. The backing plate 1200 can be used to provide additional stiffness or other reinforcement for the mounting device 100. This can be useful, for example, in order to reduce or avoid stress-induced distortions of the mounting device 100 or a component coupled to the mounting device 100 caused by lockdown of the mounting device 100. Note that while the mounting device 100 in this example is coupled to the mirror 402, the mounting device 100 can be coupled to any other suitable optical or non-optical component(s).

As shown in FIGS. 12 through 15, the backing plate 1200 generally represents a flat plate, which in some embodiments can have a shape that is complementary to or that matches the shape of the back side of the mounting device 100. In this example, the backing plate 1200 includes openings 1202 that generally align with the third openings 144 of the mounting device 100. The openings 1202 of the backing plate 1200 can have the same size as the third openings 144 of the mounting device 100 or a different size (as long as the lockable fasteners 412, 414, and 416 are able to pass through the openings 1202 into the third openings 144).

The backing plate 1200 also includes a number of fastener holes 1204 through which fasteners 1206 can pass in order to secure the backing plate 1200 to the mounting device 100. For example, the fasteners 1206 can represent bolts, screws, or other connectors that pass through the fastener holes 1204 and into the reinforcement holes 146 of the outer hub 106. As noted above, the reinforcement holes 146 of the outer hub 106 can be internally-threaded holes or other structures that receive the fasteners 1206 in order to secure the backing plate 1200 on the mounting device 100. The backing plate 1200 further includes a number of pin holes 1208, where pins 1210 inserted into the pin holes 148 of the outer hub 106 can enter into the pin holes 1208 of the backing plate 1200 in order to help hold the backing plate 1200 in place during installation.

In addition, the backing plate 1200 includes a number of posts 1212, which represent projections extending from the plate and which are insertable into the first set of post holes 114 of the device mount 102 and into the second set of post holes 126 of the inner hub 104. This allows the backing plate 1200 to engage the device mount 102 and the inner hub 104 in order to engage both flexures forming the compound nested flexure of the mounting device 100. The post holes 114 and 126 here are "oversized," meaning each post hole 114 and 126 has a cross-sectional size that is larger than the cross-sectional size of a corresponding post 1212. As a result, the posts 1212 of the backing plate 1200 can be inserted into the post holes 114 and 126 of the mounting device 100 regardless of the adjustments to the positions of the device mount 102 and the inner hub 104 as described above. Injection channels 1214 extend through the backing plate 1200 and through the posts 1212. Once the flexures are set in their desired positions, a bonding agent can be injected through the injection channels 1214 and into the spaces remaining within the post holes 114 and 126. This can help to secure the inner hub 104 and the device mount 102 to the backing plate 1200.

Although FIGS. 12 through 15 illustrate one example of a backing plate 1200 used with a mounting device 100 having integrated alignment adjustment features and locking mechanisms, various changes may be made to FIGS. 12 through 15. For example, the backing plate 1200 can have any other suitable size, shape, and dimensions and does not need to closely match the contours of the mounting device 100. Also, the backing plate 1200 can be secured to the mounting device 100 in any other suitable manner.

Figure 16A:
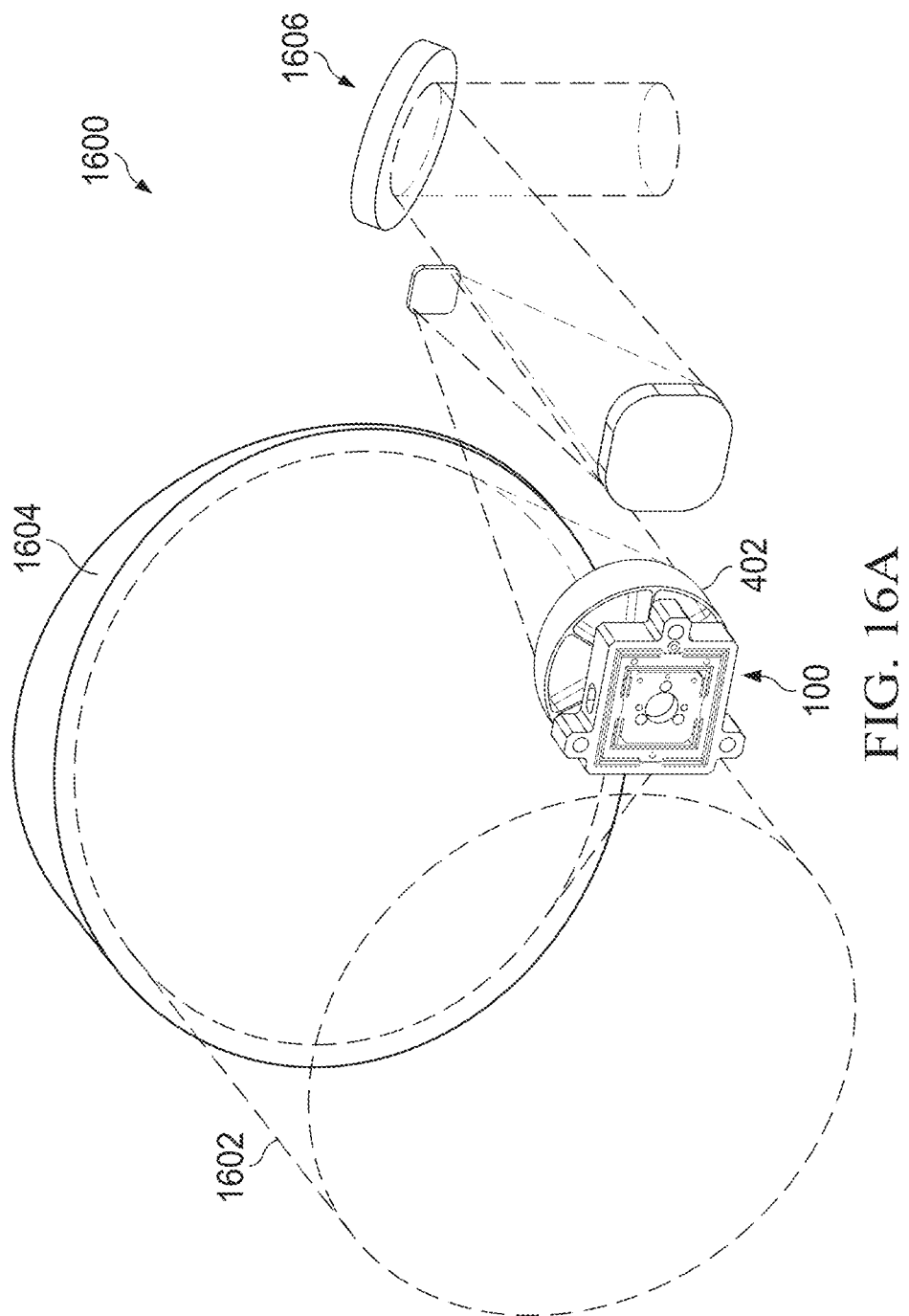
FIGS. 16A and 16B illustrate an example system that includes a mounting device with integrated alignment adjustment features and locking mechanisms according to this disclosure.
Figure 16B:
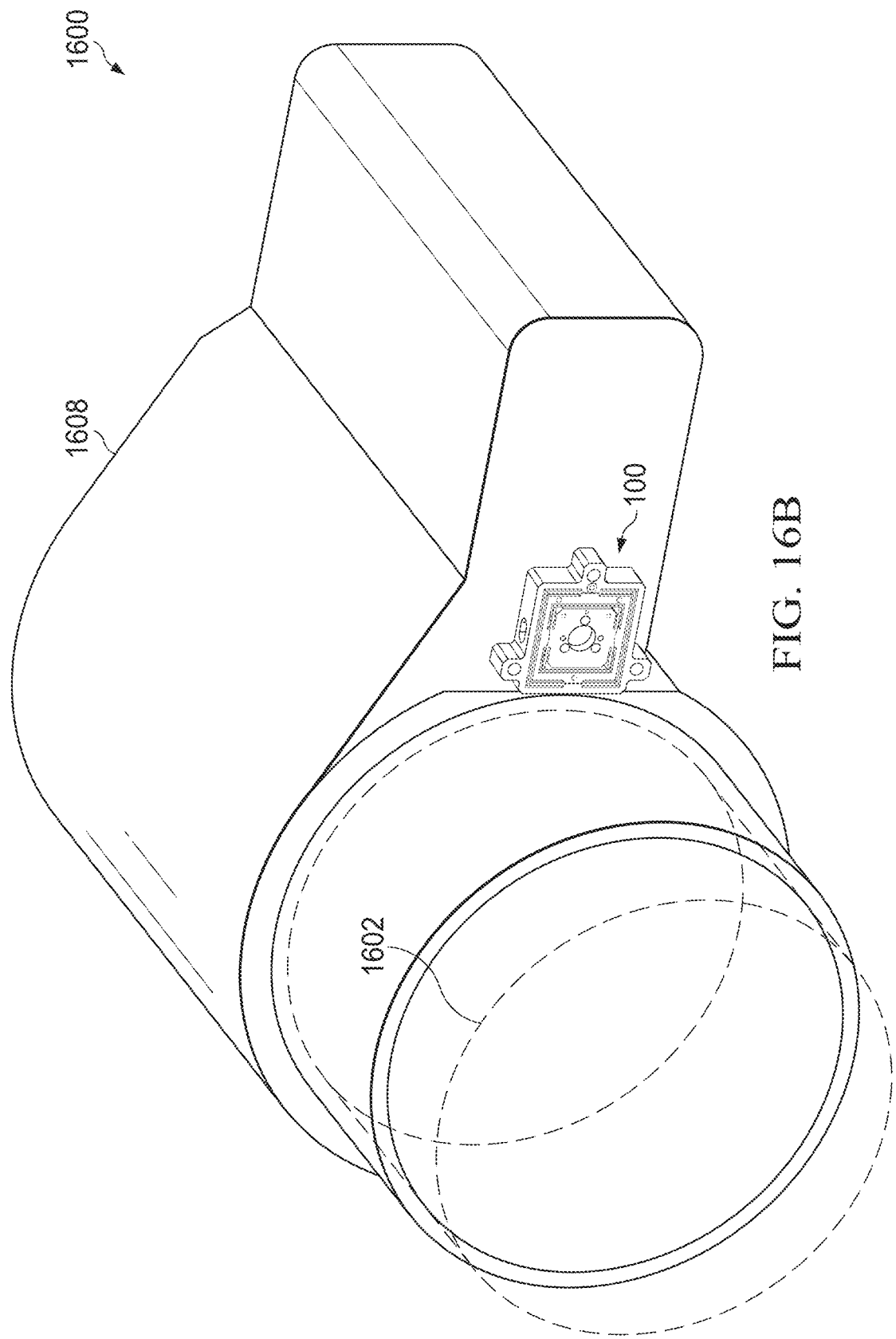

FIGS. 16A and 16B illustrate an example system 1600 that includes a mounting device 100 with integrated alignment adjustment features and locking mechanisms according to this disclosure. In particular, FIGS. 16A and 16B illustrate an example system 1600 in which a single mounting device 100 is used with the mirror 402 to redirect an optical beam.

As shown in FIGS. 16A and 16B, an incoming optical beam 1602 can be received, such as via a telescope or other structure, at a mirror 1604. The mirror 1604 focuses the optical beam 1602 and redirects the focused optical beam onto the mirror 402. The mirror 402 then redirects the focused optical beam to one or more additional optical devices 1606. The additional optical device or devices 1606 can support any suitable function or functions. For instance, the additional optical devices 1606 can include one or more splitters for dividing the optical beam into different portions, one or more additional mirrors for redirecting the optical beam or portions thereof, and one or more cameras or other detectors or sensors for measuring or sensing the optical beam or portions thereof. In general, the system 1600 can include any suitable focal or afocal optical system components that are configured to receive and process at least one optical beam in some manner. Here, "processing" can include redirecting an optical beam, focusing or expanding an optical beam, splitting an optical, combining optical beams, measuring one or more characteristics of an optical beam, or other functions that alter or measure a beam in some manner. A housing 1608 surrounds or otherwise contains the mirrors 1604 and 402 and the additional optical devices 1606. The housing 1608 represents a support structure on or to which the mounting device 100 can be coupled.

In some embodiments, the additional optical devices 1606 can be packaged and installed on a ground, airborne, or space vehicle or other fixed or movable structure. Within their own package, the additional optical devices 1606 can be precisely positioned, oriented, and aligned so that the additional optical devices 1606 perform desired operations. Similarly, a telescope that receives the optical beam 1602 (and its associated mirror 1604) can be installed on the ground, airborne, or space vehicle or other fixed or movable structure. However, the specific positions and orientations of the telescope and the package containing the optical devices 1606 may not be exactly consistent across all vehicles or other fixed or movable structures. If the mirror 402 was simply mounted in a predefined location on the housing 1608, the optical system 1600 may perform poorly or less optimally since the focused incoming beam from the mirror 1604 may not be redirected as expected to the additional optical devices 1606. By mounting the mirror 402 on the mounting device 100 and mounting the device 100 to the housing 1608, the mounting device 100 allows the position, orientation, or alignment of the mirror 402 to be adjusted as needed. This helps to facilitate more accurate operation of the system 1600.

Although FIGS. 16A and 16B illustrate one example of a system 1600 that includes a mounting device 100 with integrated alignment adjustment features and locking mechanisms, various changes may be made to FIGS. 16A and 16B. For example, the system 1600 can include any number of components mounted using any number of mounting devices 100. Also, one or more instances of the mounting device 100 can be used in any other suitable manner.

Figure 17:
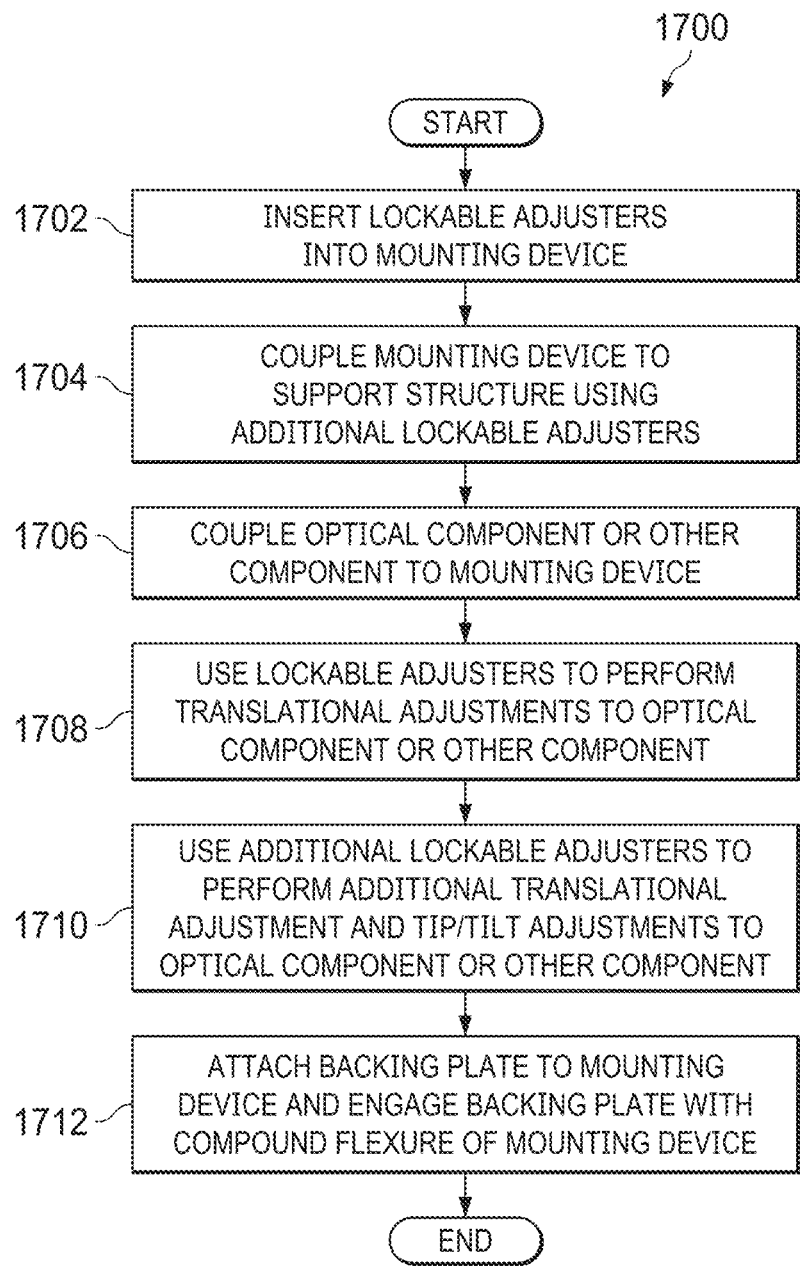
FIG. 17 illustrates an example method for using a mounting device with integrated alignment adjustment features and locking mechanisms according to this disclosure.

FIG. 17 illustrates an example method 1700 for using a mounting device with integrated alignment adjustment features and locking mechanisms according to this disclosure. For ease of explanation, the method 1700 is described as using the mounting device 100 with an optical device (such as a mirror 402 or lens/lens group 902) and a backing plate 1200. However, the method 1700 can involve the use of any suitable mounting device(s) with any suitable optical or other component(s), and the use of the backing plate is optional.

As shown in FIG. 17, lockable adjusters are inserted into a mounting device at step 1702. This can include, for example, inserting a lockable fastener 408 through a first opening 136 of the mounting device 100 and inserting a lockable fastener 410 through a second opening 138 of the mounting device 100. The mounting device is secured to a support structure using additional lockable adjusters at step 1704. This can include, for example, inserting lockable fasteners 412-416 through third openings 144 of the mounting device 100. This can also include using the lockable fasteners 412-416 to attach the mounting device 100 to a housing 1608 or other structure of a larger device or system.

At least one optical component or other component is coupled to the mounting device at step 1706. This can include, for example, passing the fasteners 406 through the fastening holes 110 of the mounting device 100 and securing a mirror 402 or lens/lens group 902 to the device mount 102 of the mounting device 100 using the fasteners 406. However, any other suitable technique can be used to fixedly or removably attach one or more components to the device mount 102 of the mounting device 100.

The lockable adjusters can be used to perform translational adjustments to the at least one optical component or other component at step 1708. This can include, for example, using the lockable fastener 408 to move the inner hub 104 within the outer hub 106 along one axis and using the lockable fastener 410 to move the device mount 102 within the inner hub 104 along other axis. These two axes can be orthogonal.

The additional lockable adjusters can be used to perform additional translational adjustment and tip/tilt adjustments to the at least one optical component or other component at step 1710. This can include, for example, adjusting all of the lockable fasteners 412-416 to move the mounting device 100 closer to or farther from the housing 1608 or other support structure along a third axis. All three axes can be orthogonal. This can also include adjusting one or some (but not all) of the lockable fasteners 412-416 to alter the tip/tilt of the component(s).

If desired, a backing plate can be attached to the mounting device and engage the compound flexure of the mounting device at step 1712. This can include, for example, passing the fasteners 1206 through the fastener holes 1204 of the backing plate 1200 into the reinforcement holes 146 of the mounting device 100 to secure the backing plate 1200 to the outer hub 106. This can also include inserting the pins 1210 of the mounting device 100 into the pin holes 1208 of the backing plate 1200 and inserting the posts 1212 of the backing plate 1200 into the post holes 114 and 126 of the mounting device 100. This can further include injecting a bonding agent through the injection channels 1214 to fill remaining spaces in the post holes 114 and 126 of the mounting device 100.

Although FIG. 17 illustrates one example of a method 1700 for using a mounting device with integrated alignment adjustment features and locking mechanisms, various changes may be made to FIG. 17. For example, while shown as a series of steps, various steps in FIG. 17 can overlap, occur in parallel, occur in a different order, or occur any number of times. As a particular example, the mounting device 100 can be coupled to a support structure after an optical component or other component is coupled to the mounting device 100.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element,"

"member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a device mount configured to be coupled to a component;
an inner hub coupled to the device mount by a first flexure, the first flexure configured to permit translational movement of the device mount within the inner hub along a first axis;
an outer hub coupled to the inner hub by a second flexure, the second flexure configured to permit translational movement of the device mount and the inner hub within the outer hub along a second axis different from the first axis, the first and second flexures forming a compound nested flexure, wherein the outer hub is configured to be coupled to a support structure and to permit both (i) translational movement of the apparatus along a third axis different from the first and second axes and (ii) tip or tilt adjustment of the apparatus;
a first lockable adjuster configured to control movement of the device mount within the inner hub in order to control the translational movement along the first axis;
a second lockable adjuster configured to control movement of the inner hub within the outer hub in order to control the translational movement along the second axis; and
third lockable adjusters configured to couple the outer hub to the support structure and to control the translational movement along the third axis and the tip or tilt adjustment.

2. The apparatus of claim 1, wherein the first, second, and third lockable adjusters are configured to be locked in order to prevent unintended movement of the device mount, the inner hub, and the outer hub.

3. The apparatus of claim 1, wherein:
the first lockable adjuster is configured to cause movement of the device mount only along the first axis and not along the second and third axes; and
the second lockable adjuster is configured to cause movement of the inner hub and the device mount only along the second axis and not along the first and third axes.

4. The apparatus of claim 1, wherein:
the outer hub comprises:
  a first opening located in a side of the outer hub and configured to receive the first lockable adjuster;
  at least one second opening located in at least one other side of the outer hub and configured to receive the second lockable adjuster; and
  multiple flanges extending from different sides of the outer hub, the flanges comprising third openings configured to receive the third lockable adjusters; and
the inner hub comprises a fourth opening configured to receive the second lockable adjuster.

5. The apparatus of claim 1, wherein:
the first flexure comprises a first pair of support bars on opposite sides of the device mount and first and second connecting arms coupling the first pair of support bars to the device mount and the inner hub;
the second flexure comprises a second pair of support bars on opposite sides of the inner hub and third and fourth connecting arms coupling the second pair of support bars to the inner hub and the outer hub; and
the first and second pairs of support bars extend in transverse directions with respect to each other.

6. An apparatus comprising:
a device mount configured to be coupled to a component;
an inner hub coupled to the device mount by a first flexure, the first flexure configured to permit translational movement of the device mount within the inner hub along a first axis;
an outer hub coupled to the inner hub by a second flexure, the second flexure configured to permit translational movement of the device mount and the inner hub within the outer hub along a second axis different from the first axis, the first and second flexures forming a compound nested flexure, wherein the outer hub is configured to be coupled to a support structure and to permit both (i) translational movement of the apparatus along a third axis different from the first and second axes and (ii) tip or tilt adjustment of the apparatus; and
a backing plate configured to be fastened to the outer hub;
wherein the backing plate comprises posts configured to be inserted into post holes of the inner hub and the device mount; and
wherein each post comprises an injection channel configured to allow a bonding agent to pass through the post and into a corresponding one of the post holes.

7. The apparatus of claim 6, further comprising:
a first lockable adjuster configured to control movement of the device mount within the inner hub in order to control the translational movement along the first axis;
a second lockable adjuster configured to control movement of the inner hub within the outer hub in order to control the translational movement along the second axis; and
third lockable adjusters configured to couple the outer hub to the support structure and to control the translational movement along the third axis and the tip or tilt adjustment.

8. A system comprising:
multiple optical components configured to receive and process at least one optical beam; and
at least one mounting device configured to adjust a position, orientation, or alignment of one or more of the optical components;
wherein each mounting device comprises:
  a device mount configured to be coupled to at least one of the optical components;
  an inner hub coupled to the device mount by a first flexure, the first flexure configured to permit translational movement of the device mount within the inner hub along a first axis;
  an outer hub coupled to the inner hub by a second flexure, the second flexure configured to permit translational movement of the device mount and the inner hub within the outer hub along a second axis different from the first axis, the first and second flexures forming a compound nested flexure, wherein the outer hub is configured to be coupled to a support structure and to permit both (i) translational movement of the mounting device along a third axis different from the first and second axes and (ii) tip or tilt adjustment of the mounting device;
a first lockable adjuster configured to control movement of the device mount within the inner hub in order to control the translational movement along the first axis;
a second lockable adjuster configured to control movement of the inner hub within the outer hub in order to control the translational movement along the second axis; and
third lockable adjusters configured to couple the outer hub to the support structure and to control the translational movement along the third axis and the tip or tilt adjustment.

9. The system of claim 8, wherein the first, second, and third lockable adjusters of each mounting device are configured to be locked in order to prevent unintended movement of the device mount, the inner hub, and the outer hub of the mounting device.

10. The system of claim 8, wherein, in each mounting device:
the first lockable adjuster is configured to cause movement of the device mount only along the first axis and not along the second and third axes; and
the second lockable adjuster is configured to cause movement of the inner hub and the device mount only along the second axis and not along the first and third axes.

11. The system of claim 8, wherein in each mounting device:
the outer hub comprises:
a first opening located in a side of the outer hub and configured to receive the first lockable adjuster;
at least one second opening located in at least one other side of the outer hub and configured to receive the second lockable adjuster; and
multiple flanges extending from different sides of the outer hub, the flanges comprising third openings configured to receive the third lockable adjusters; and
the inner hub comprises a fourth opening configured to receive the second lockable adjuster.

12. The system of claim 8, wherein in each mounting device:
the first flexure comprises a first pair of support bars on opposite sides of the device mount and first and second connecting arms coupling the first pair of support bars to the device mount and the inner hub;
the second flexure comprises a second pair of support bars on opposite sides of the inner hub and third and fourth connecting arms coupling the second pair of support bars to the inner hub and the outer hub; and
the first and second pairs of support bars extend in transverse directions with respect to each other.

13. A system comprising:
multiple optical components configured to receive and process at least one optical beam; and
at least one mounting device configured to adjust a position, orientation, or alignment of one or more of the optical components;
wherein each mounting device comprises:
a device mount configured to be coupled to at least one of the optical components;
an inner hub coupled to the device mount by a first flexure, the first flexure configured to permit translational movement of the device mount within the inner hub along a first axis;
an outer hub coupled to the inner hub by a second flexure, the second flexure configured to permit translational movement of the device mount and the inner hub within the outer hub along a second axis different from the first axis, the first and second flexures forming a compound nested flexure, wherein the outer hub is configured to be coupled to a support structure and to permit both (i) translational movement of the mounting device along a third axis different from the first and second axes and (ii) tip or tilt adjustment of the mounting device; and
a backing plate configured to be fastened to the outer hub of the mounting device, wherein the backing plate comprises posts configured to be inserted into post holes of the inner hub and the device mount of the mounting device, and wherein each post comprises an injection channel configured to allow a bonding agent to pass through the post and into a corresponding one of the post holes.

14. The system of claim 13, wherein each mounting device further comprises:
a first lockable adjuster configured to control movement of the device mount within the inner hub in order to control the translational movement along the first axis;
a second lockable adjuster configured to control movement of the inner hub within the outer hub in order to control the translational movement along the second axis; and
third lockable adjusters configured to couple the outer hub to the support structure and to control the translational movement along the third axis and the tip or tilt adjustment.

15. A method comprising:
coupling an outer hub of a mounting device to a support structure;
coupling a component to a device mount of the mounting device;
using a first flexure coupling the device mount and an inner hub of the mounting device, causing translational movement of the device mount within the inner hub along a first axis;
using a second flexure coupling the outer hub and the inner hub, causing translational movement of the device mount and the inner hub within the outer hub along a second axis different from the first axis, the first and second flexures forming a compound nested flexure; and
using the outer hub, causing translational movement of the mounting device along a third axis different from the first and second axes and tip or tilt adjustment of the mounting device;
wherein causing the translational movement of the device mount along the first axis comprises using a first lockable adjuster;
wherein causing the translational movement of the device mount and the inner hub along the second axis comprises using a second lockable adjuster; and
wherein causing the translational movement of the mounting device along the third axis and the tip or tilt adjustment of the mounting device comprises using third lockable adjusters coupling the outer hub to the support structure.

16. The method of claim 15, further comprising:
locking the first, second, and third lockable adjusters to prevent unintended movement of the device mount, the inner hub, and the outer hub.

17. The method of claim 15, wherein:
the first flexure comprises a first pair of support bars on opposite sides of the device mount and first and second connecting arms coupling the first pair of support bars to the device mount and the inner hub;
the second flexure comprises a second pair of support bars on opposite sides of the inner hub and third and fourth connecting arms coupling the second pair of support bars to the inner hub and the outer hub; and
the first and second pairs of support bars extend in transverse directions with respect to each other.

18. The method of claim 15, wherein the first, second, and third axes are orthogonal.

19. A method comprising:
coupling an outer hub of a mounting device to a support structure;
coupling a component to a device mount of the mounting device;
using a first flexure coupling the device mount and an inner hub of the mounting device, causing translational movement of the device mount within the inner hub along a first axis;
using a second flexure coupling the outer hub and the inner hub, causing translational movement of the device mount and the inner hub within the outer hub along a second axis different from the first axis, the first and second flexures forming a compound nested flexure;
using the outer hub, causing translational movement of the mounting device along a third axis different from the first and second axes and tip or tilt adjustment of the mounting device;
inserting posts of a backing plate into post holes of the inner hub and the device mount;
fastening the backing plate to the outer hub; and
injecting a bonding agent through injection channels in the posts into the corresponding post holes.

20. The method of claim 19, wherein:
causing the translational movement of the device mount along the first axis comprises using a first lockable adjuster;
causing the translational movement of the device mount and the inner hub along the second axis comprises using a second lockable adjuster; and
causing the translational movement of the mounting device along the third axis and the tip or tilt adjustment of the mounting device comprises using third lockable adjusters coupling the outer hub to the support structure.

* * * * *